US010127066B1

(12) United States Patent
Sethuramalingam et al.

(10) Patent No.: US 10,127,066 B1
(45) Date of Patent: Nov. 13, 2018

(54) SERVER SYNCHRONIZATION USING CONTINUOUS BLOCK MIGRATION IN PROVIDER NETWORK ENVIRONMENTS

(71) Applicant: Amazon Technologies, Inc., Seattle, WA (US)

(72) Inventors: Ekanth Sethuramalingam, Milpitas, CA (US); Suk Won Kim, Palo Alto, CA (US); John Merrill Phillips, Seattle, WA (US); David Samuel Zipkin, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 15/087,758

(22) Filed: Mar. 31, 2016

(51) Int. Cl.
*G06F 9/455* (2018.01)
*H04L 29/06* (2006.01)
*H04L 29/08* (2006.01)

(52) U.S. Cl.
CPC ...... *G06F 9/45558* (2013.01); *H04L 67/1095* (2013.01); *H04L 67/42* (2013.01); *G06F 2009/4557* (2013.01); *G06F 2009/45583* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 9,218,197 | B2 | 12/2015 | Balani et al. | |
|---|---|---|---|---|
| 2005/0193255 | A1* | 9/2005 | McCollum | G11C 5/005 714/30 |
| 2006/0010176 | A1 | 1/2006 | Armington | |
| 2008/0162604 | A1 | 7/2008 | Soulet et al. | |
| 2011/0161299 | A1* | 6/2011 | Prahlad | G06F 17/30091 707/649 |
| 2012/0254861 | A1* | 10/2012 | Down, Jr. | G06F 8/63 718/1 |
| 2013/0091183 | A1* | 4/2013 | Edwards | G06F 3/0605 707/803 |

(Continued)

OTHER PUBLICATIONS

Redhat, Getting Started with Cloud Computing: Amazon EC2 on Red Hat Enterprise Linux, 2008, Redhat.*

(Continued)

*Primary Examiner* — Charlie Sun
(74) *Attorney, Agent, or Firm* — Robert C. Kowert; Meyertons, Hood, Kivlin, Kowert & Goetzel, P.C.

(57) ABSTRACT

Methods and apparatus for updating virtual machines (VMs) on a provider network according to modifications made to a server in a client network. A version of the server may be currently instantiated and executing as one or more VM instances on the provider network. Agent(s) installed on the server in the client network intercept write requests to volume(s) attached to the server, and send blocks that include updates to the server volume(s) to a service on the provider network. The service stores the blocks to incremental snapshots, and generates timestamped machine images (MIs) of the server from the snapshots. A VM service updates the VM instances on the provider network according to the MIs. Thus, the VM instances can be kept up to date with changes to the server without having to upload the entire volume(s) to the provider network to perform each update.

20 Claims, 17 Drawing Sheets

(56) References Cited

U.S. PATENT DOCUMENTS

| | | | |
|---|---|---|---|
| 2013/0227089 A1* | 8/2013 | McLeod | G06F 9/45558 709/220 |
| 2014/0007100 A1 | 1/2014 | Gu et al. | |
| 2015/0178128 A1 | 6/2015 | Knowles et al. | |
| 2015/0242159 A1 | 8/2015 | Tsirkin | |
| 2015/0261581 A1 | 9/2015 | Wang | |
| 2015/0309839 A1 | 10/2015 | Lu | |
| 2015/0324227 A1 | 11/2015 | Sizemore | |
| 2015/0331709 A1 | 11/2015 | Agrawal et al. | |
| 2015/0339156 A1 | 11/2015 | Vincent et al. | |
| 2015/0355924 A1 | 12/2015 | Holla et al. | |
| 2016/0028624 A1 | 1/2016 | Song et al. | |
| 2016/0034302 A1 | 2/2016 | Fries et al. | |

OTHER PUBLICATIONS

U.S. Appl. No. 15/087,765, filed Mar. 31, 2016, Ekanth Sethuramalingam.

\* cited by examiner

SERVER SYNCHRONIZATION USING CONTINUOUS BLOCK MIGRATION IN PROVIDER NETWORK ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1:
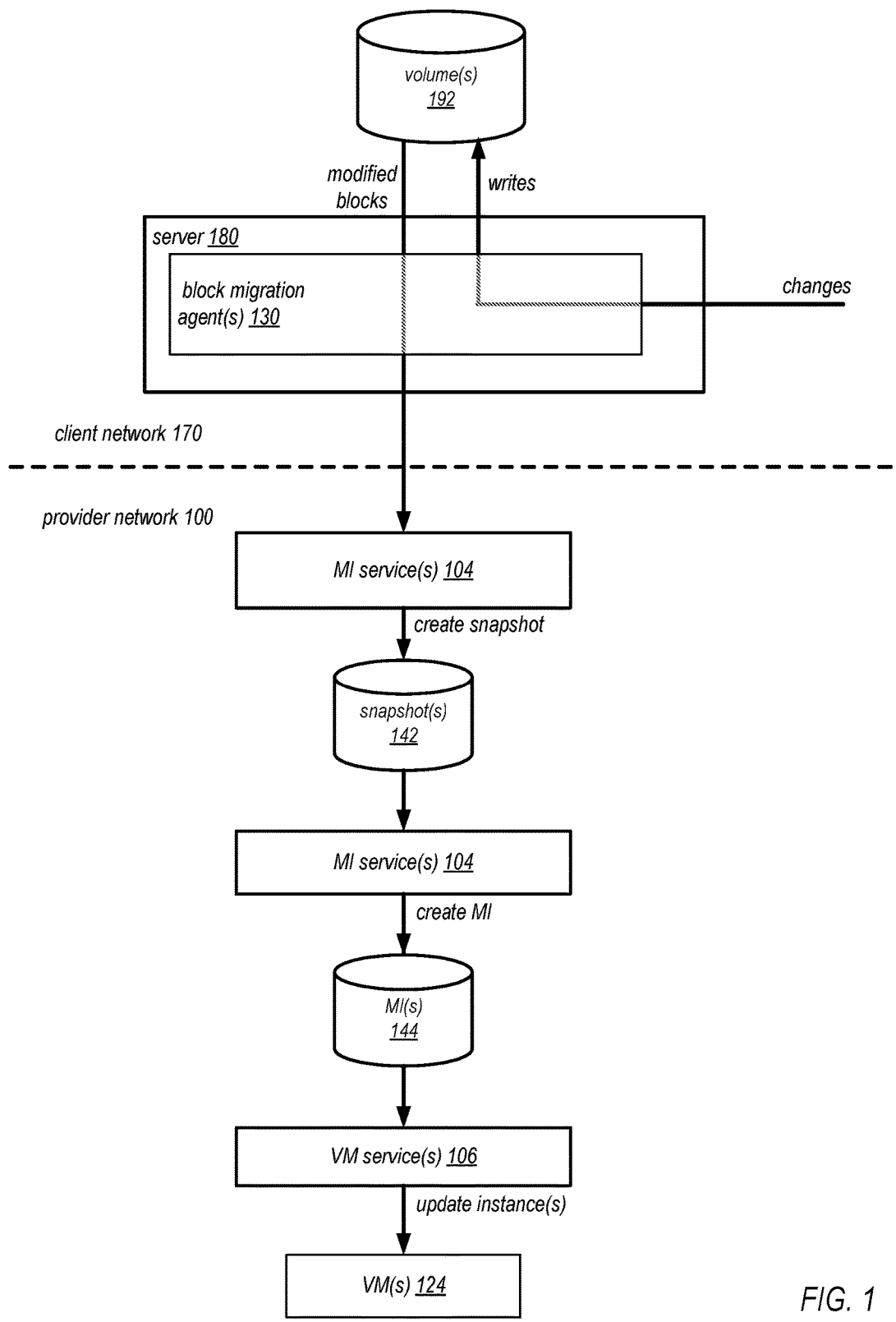
FIG. 1 is a high-level block diagram that graphically illustrates server synchronization using continuous block migration in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for synchronizing servers from client networks to a provider network using continuous block migration are described. The methods and apparatus allow a server (e.g., a virtual machine (VM), or virtualization environment that implements VMs) on a client network in a customer's data center to be continuously synchronized to the provider network as changes are made to the server, for example during development of the server in a development and test environment, and to be rapidly deployed to update the client's VM instances(s) that implement the server on the provider network. Using embodiments, the client's VM instance(s) on the provider network can be kept up to date with changes or updates to the server on the client network without having to periodically upload the entire volume(s) from the client network to the provider network Conventionally, to update a client's VM instances on the provider network with new versions developed on servers in the client network, the client makes all the necessary changes, commits the changes to the server's volume(s) on the client network, and then uploads the entire volume(s) to storage on the provider network. All of the server's data including operating system (OS) data and application data, stored as one or more volumes on the client network, is copied or moved to volume(s) in storage on the provider network over an intermediate network such as the Internet. Once the volume(s) have completed uploading to the provider network, the client directs a service of the provider network to generate a machine image from the volume(s), for example via a user interface (UI) on a console in the client network, and then directs another service to replace or update the client's VM instances on the provider network that implement the server functionality using the generated machine image. However, copying all of the server's data from the client network over the intermediate network to the provider network can take a considerable amount of time, as gigabytes or even terabytes of data may need to be transferred over the intermediate network. In addition, the update process involves many steps that the client has to perform manually, making the process substantially a manual process. For at least these reasons, clients typically do not perform such an update very often, perhaps performing major updates once a week, or once a month. In addition, if a significant update such as a bug fix or security update needs to be performed, there may be considerable delay between the time the updated server is ready on the client network and the time the client's VMs that implement the server's functionality on the provider network are updated.

Using embodiments of the methods and apparatus for synchronizing servers using continuous block migration as described herein, instead of having to upload all of the server's data to the provider network for each update to the client's VM instance(s) on the provider network, all changes to the server are synchronized to the provider network as they happen, and are stored to a snapshot of the server on the provider network. When a snapshot is complete, a machine image is generated from the snapshot; the machine image can be used to update the client's VM instance(s) on the provider network. Thus, the client's VM instance(s) on the provider network can be kept up to date with changes to the server on the client network without having to upload the server's entire volume(s) to the provider network to perform each update, and important or necessary updates to the server on the client network can be reflected to the client's VM(s) on the provider network more rapidly.

Figure 2:
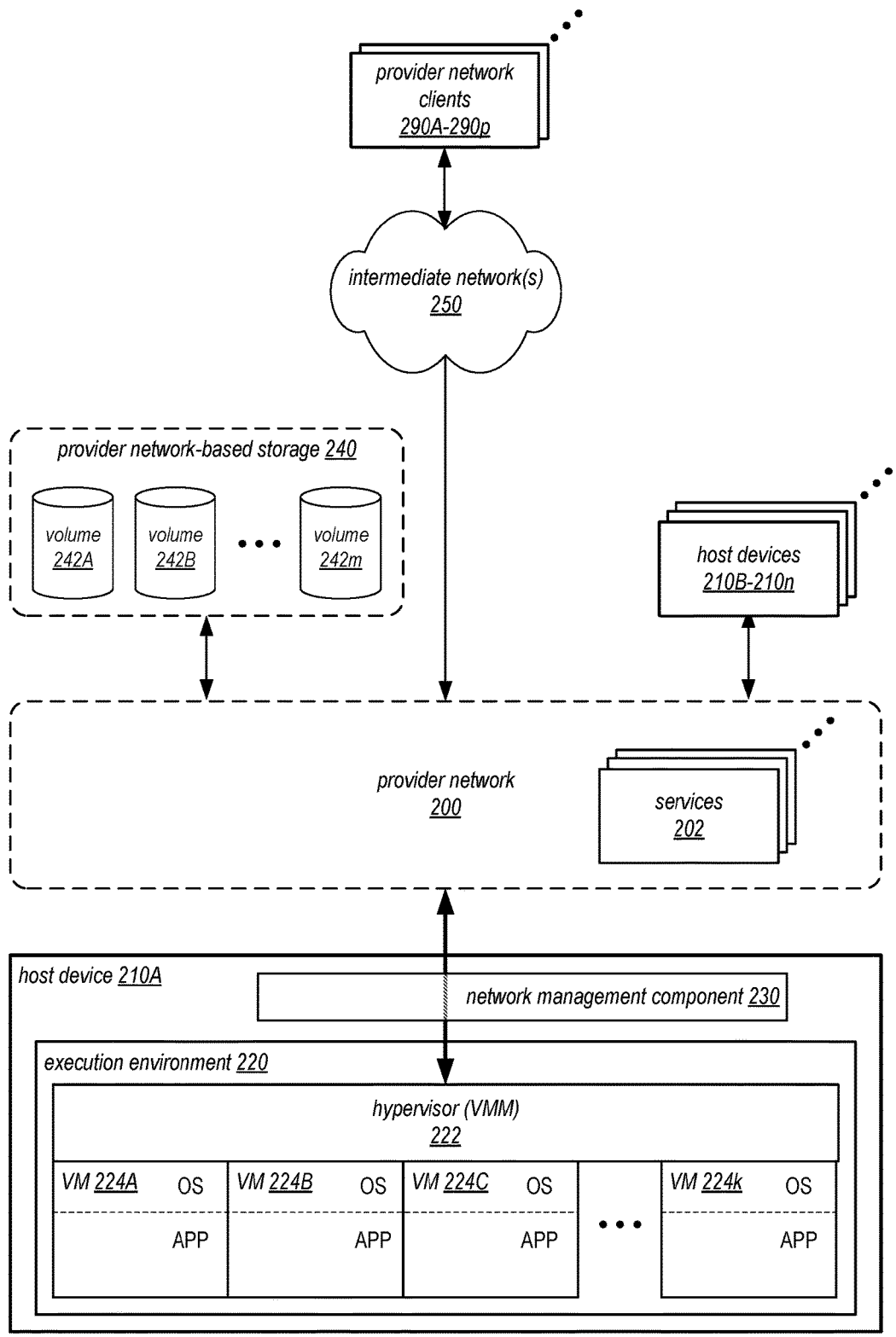
FIG. 2 illustrates an example provider network environment in which embodiments of the methods and apparatus for server synchronization using continuous block migration in provider network environments may be implemented.

FIG. 2 is a high-level block diagram that graphically illustrates server synchronization using continuous block migration in a provider network environment, according to some embodiments. As shown in FIG. 2, one or more block migration agents 130 are installed on a server 180 in the client network 170, for example a server under development in a development environment on the client network 170. The agent(s) 130 detect changes to the server 180's volume(s) 192 on the client network 170, for example by intercepting write operations to the volume(s) 192, and continuously send blocks from the volume(s) 192 that include the changes to the provider network 100 via a connection over an intermediate network such as the Internet. For example, the changes may be sent to a machine image (MI) service 104 on the provider network 100 according to an API of the service 104. The changes may include any changes to the server 180's operating system (OS), application, or user software and/or data that generate updates, writes, additions, or deletions to content on the server's attached volume(s) 192. As non-limiting examples, the changes may include changes to source operating system (OS) or application code; changes to code source files or compiled code; patches to code; addition or deletion of programs, applications, drivers, scripts, etc.; changes to configuration files; changes to data files; adding, renaming, moving, or deleting files; adding, renaming, moving, or deleting directories or other file system structures; changes to server security, access, authentication, and/or authorization software, data, and configurations; or in general any addition, modification, or deletion of any content (e.g., OS or application code and data) that is stored on the server 180's volume(s) 192.

In some embodiments, the MI service 104 receives the blocks from the agent(s) 130 on the server 190 via the connection and stores the blocks to incremental snapshots 142 on a storage subsystem of the provider network 100, converting the blocks to a format used on the storage subsystem if necessary. In some embodiments, the MI service 104 stores the blocks to a current snapshot 142 being generated, and periodically or aperiodically completes, closes, and timestamps the snapshot 142, for example at the request of the client, according to a schedule (e.g., every 8, 12, or 24 hours), or in response to an event such as successful completion of a test cycle on the client network 170. At completion of a snapshot 142, the MI service 104 begins storing the blocks received from the agent(s) 130 on the server 180 to a new (current) snapshot 142 for the server 180. Each snapshot 142 is timestamped, and reflects a point in time state of the volume(s) 192 that are attached to the server 180 in the client network 130. If the server 180 has two or more attached volumes 192, the consistency point for the snapshot 142 is across all of the volumes 192. Thus, a snapshot 142 represents a consistent, point in time state of the entire server 180.

In some embodiments, the server 180's data may be stored in the volume(s) 192 in storage of the client network 170 in blocks of a format that is different from a block format used by the storage subsystem on the provider network 100. In these embodiments, the MI service 104 may first convert blocks received from the agent(s) 130 on the server 170 in the client network 170 to the format used by the storage subsystem on the provider network 100 before storing the blocks to the snapshot(s) 142 on the provider network 100's storage subsystem.

In some embodiments, machine images (MIs) 144 may be periodically or aperiodically generated from the snapshots 142, for example at the request of the client, according to a schedule (e.g., every 8, 12, or 24 hours), or in response to an event such as successful completion of a test cycle on the client network 170. For example, in some embodiments, when a snapshot 142 is completed as described above, a new MI 144 may be generated from the snapshot 142, either automatically or at the request of the client. Each MI 144 captures all of the changes that were made to the server 180 being synchronized between a previous version of the MI 144 for the server 180 and its creation. In some embodiments, a VM service 106 on the provider network 100 may update the client's VM(s) 124 on the provider network 100 according to the MIs, 144 for example at the request of the client, or according to an update schedule or policy. Thus, the client's VM instances 124 on the provider network 100 can be kept up to date with changes to the server 180 on the client network 170 without having to upload the server 180's entire volume(s) 192 to the provider network 100 to perform each update, and important or necessary updates can be made to the client's VMs 124 on the provider network 100 more rapidly.

Embodiments of the methods and apparatus for synchronizing servers using continuous block migration may, for example, be implemented in the context of a service provider that provides to clients or customers, via an intermediate network such as the Internet, virtualized resources (e.g., virtualized computing and storage resources) implemented on a provider network of the service provider, typically in a data center (or data centers) of the service provider. FIG. 1 illustrate an example provider network environment in which embodiments of the methods and apparatus for synchronizing servers using continuous block migration in provider network environments may be implemented. FIGS. 13 through 16 and the section titled Example provider network environments further illustrate and describe example service provider network environments in which embodiments of the methods and apparatus as described herein may be implemented.

FIG. 2 illustrates a provider network environment in which embodiments of the methods and apparatus for synchronizing servers using continuous block migration may be implemented, according to some embodiments. As shown in FIG. 2, provider network clients 290A-290p may access one or more services 202 of the provider network 200 via intermediate network(s) 250 (e.g., the Internet) to configure and manage resource instances, for example virtual machines (VMs) 224 on host device(s) 210A-210n, on the provider network 200. At least some of the resource instances on a provider network 200 may be implemented according to hardware virtualization technology that enables multiple operating systems to run concurrently within an execution environment 220 on a host device 210, i.e. as VMs 224 on a host device 210. A hypervisor 222, or virtual machine monitor (VMM), on the host device 210 presents the VMs 224 on the respective host device 210 with a virtual platform and monitors the execution of the VMs 242 on the respective host device 210. Each VM 224 may be provided with one or more IP addresses; the VMM 222 on a respective host device 210 may be aware of the IP addresses of the VMs 224 on the host.

In some embodiments, VMs 224 on a host device 210 may include virtualized computing resources of a client 290 implemented on multi-tenant hardware that is shared with other clients 290. The clients' traffic may be handled and routed to and from the clients' respective VMs 224 on the host device 210 by a network management component 230 of the host device 210. While FIG. 2 shows network management component 230 communicating with VMs 224A via hypervisor 222, in some embodiments a network management component 230 may communicate directly with a VM 224 on the respective host device 210.

Figure 17:
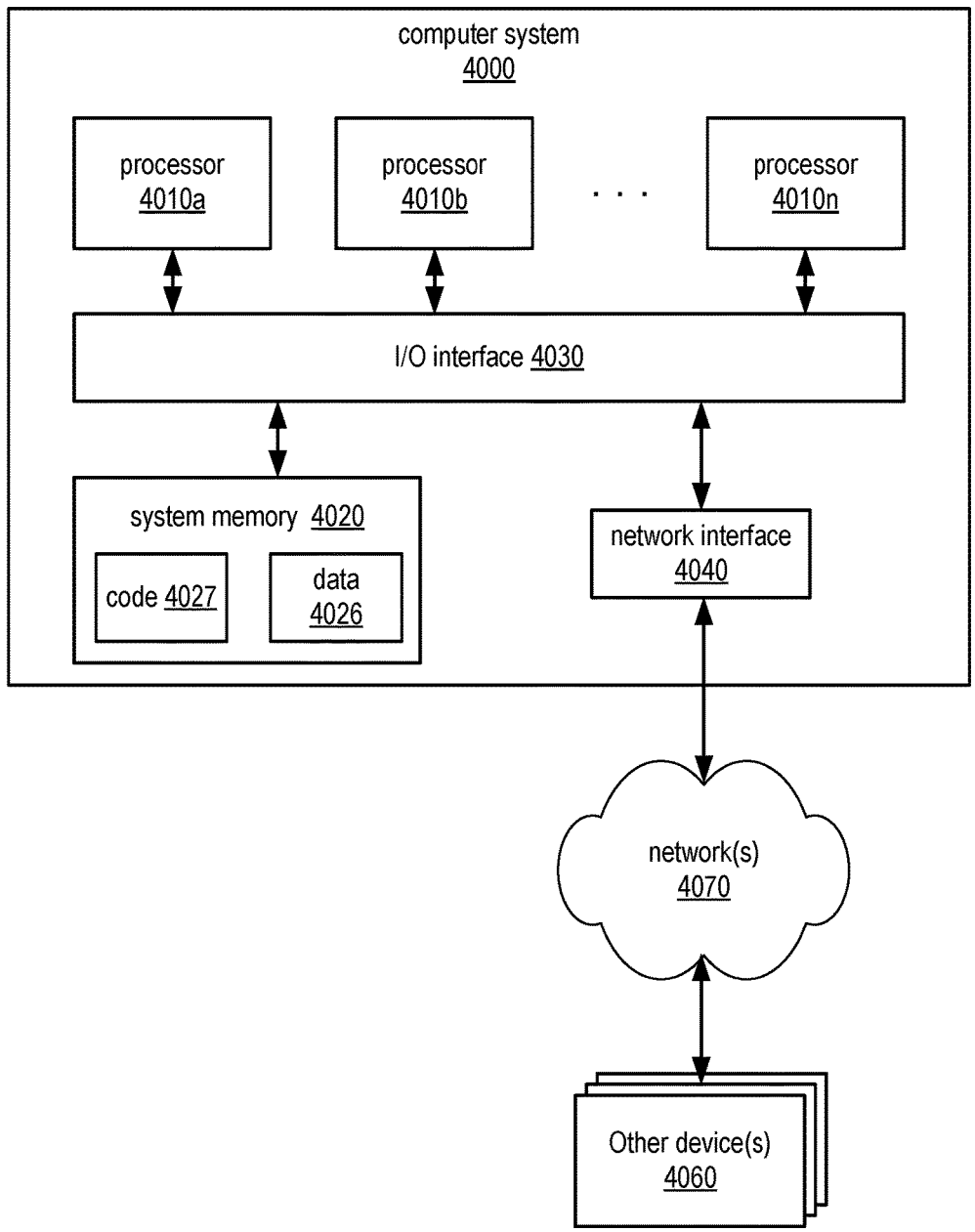
FIG. 17 is a block diagram illustrating an example computer system that may be used in some embodiments.

In some embodiments, the VMs 224 (e.g., VMs 224A-224k on example host device 210A) may be assigned network virtual addresses within an address space; the network virtual addresses may be portable addresses that can be mapped or remapped to other endpoints (e.g., other VMs 224) on the provider network 200. Packets sent from the VMs 224 may be encapsulated by a network management component 230 of the respective host device 210 and routed to their destinations via the provider network 200. Packets sent to the VMs 224 on a host device 210 may be decapsulated by the network management component 230 of the respective host device 210 and provided to respective VMs 224. FIG. 17 shows an example system that may be used as a host device 210 in some embodiments. In some embodiments, host devices 210A-210n may be or may include rack-mounted devices (e.g., rack-mounted server devices), with multiple racks in a data center that implements the provider network 200 each including one or more of the host devices 210A-210n and possibly other rack- and network-related hardware.

In some embodiments, the host devices 210 on the provider network 200 may implement VMs 224 as domains in the execution environment 220. While not shown, at least some of the host devices 210 may also provide local persistent storage for data of the VMs 224, with each VM/domain instantiated on a host device 210 (e.g., host device 210A) allocated a portion of the local persistent storage on the host device 210, for example 2 gigabyte (gB), 5 gB, etc. A hypervisor 222, or virtual machine monitor (VMM) on a host device 210 (e.g., host device 210A) may manage the VMs/domains on the respective device. Each VM/domain and its local storage allocation occupies a slot on the respective host device 210. A host device 210 may have a fixed number of slots (e.g., 8, 10, or more), with slots that are currently allocated to or reserved for a domain referred to as occupied or unavailable slots, and slots that are not allocated to or reserved for a domain referred to as unoccupied, free, or available slots.

In at least some embodiments, at least some of the VMs 224 on a host device 210 may be attached to one or more shared network-based storage 240 systems or devices, for example via one or more virtual storage services 202 offered by the provider network 200. At least some data associated with and accessed by application(s) on a given VM 224 may be stored in or as one or more virtual volumes 242 in the attached network-based storage 240. Note that the network-based storage 240 is separate from the local persistent storage that may be provided by a host device 210, and that a VM/domain is not necessarily attached to network-based storage 240. In some embodiments, other content may also be stored for clients 290 in the network-based storage 240 systems, for example machine images that may be used to instantiate VM 224 instances on host devices 210A-210n.

As shown in the example host device 210A of FIG. 2, a VM 224 may include an operating system (OS) portion (e.g. a boot sector and OS-related data) and an application (APP) portion. A VM's OS may be any type of operating system that is supported in virtualized environments, for example any of various Linux or Microsoft Windows® operating systems. A VM's application portion may implement any type of provider network-based application or applications for a respective client 290, for example various server applications, database applications, and so on.

In some embodiments, a service provider that provides a provider network 200 for clients 290 may provide one or more services 202 and application programming interfaces (APIs) that allow clients 290 to establish and manage resources in client implementations on the provider network 200 including but not limited to client private networks implementations on the provider network. A private network in a provider network environment may be broadly defined as a network space (e.g., logically defined by an address range or address space) that contains a set of provider network resources of a respective client 290, and that acts as a logically isolated section on the provider network 200 for the client 290's resources. A private network may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host devices, etc.) on a private network may be assigned IP addresses (e.g., 32-bit IPv4 addresses) within the private network's address space. A client 290's implementation, for example a private network, on the provider network 200 includes the client 290's resource instances, such as VMs 224 on host devices 210 configured as virtual computing resource instances by the client 290 and volumes 242 on provider network-based storage 240 associated with the client 290's VMs 242.

Figure 3:
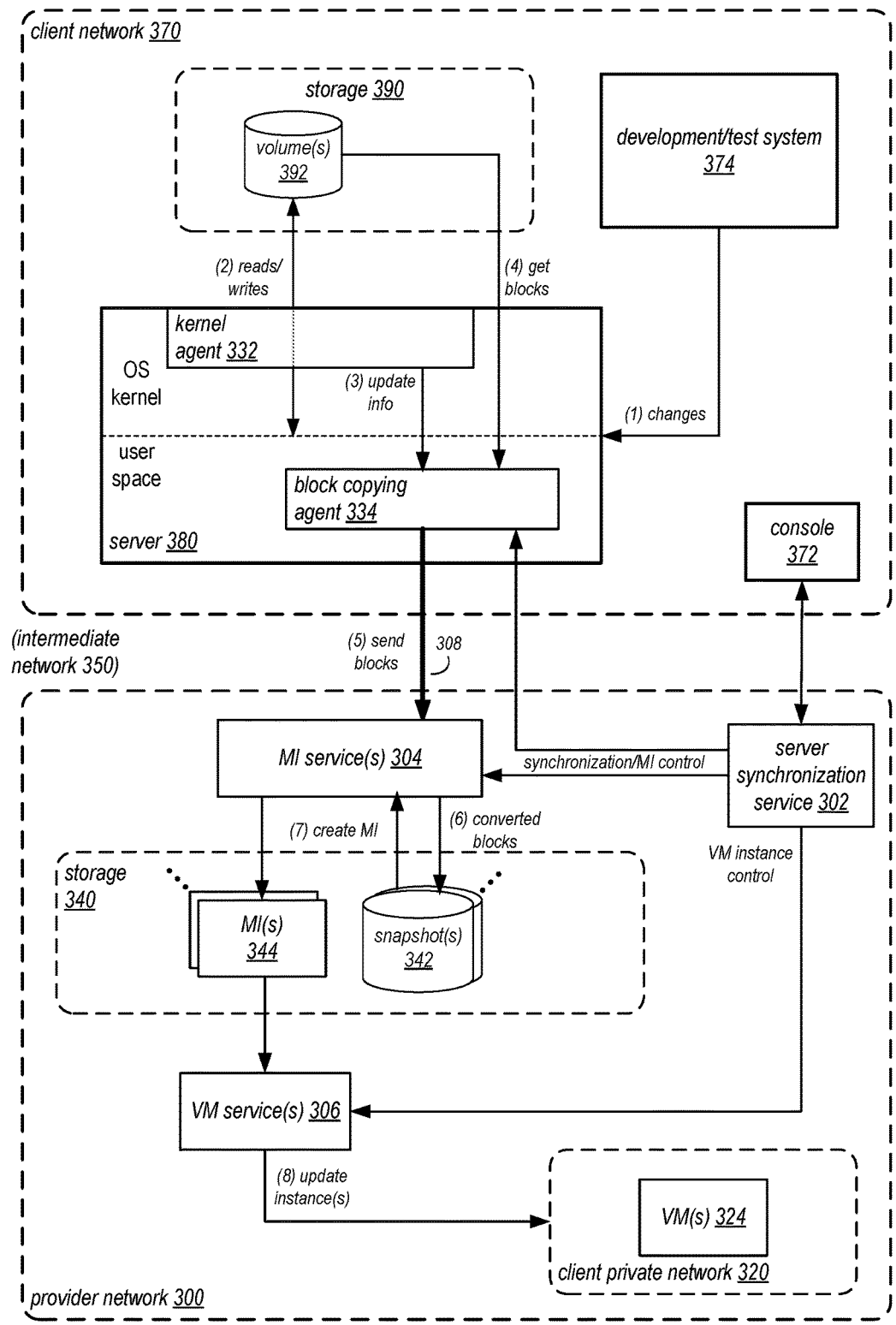
FIG. 3 is block diagram that graphically illustrates a method and apparatus for continuous block migration from a server on a client network to snapshot(s) on a provider network, and for updating virtual machine (VM) instances on the provider network using the snapshots, according to some embodiments.

FIG. 3 is block diagram that graphically illustrates a method and apparatus for continuous block migration from a server on a client network to snapshot(s) on a provider network, and for updating virtual machine (VM) instances on the provider network using the snapshots, according to some embodiments.

As shown in FIG. 3, a client network 370 may be implemented in a customer's data center (DC). A server 380 may be implemented on the client network 370. The server 380 may, for example, be a physical device that implements server functionality including an operating system (OS), for example any of various Linux or Microsoft Windows® operating systems, and one or more applications. The server 380 may instead be a virtual machine (VM) implemented in a virtualization environment on a host machine, or a host device that implements one or more virtual machines (VMs) in a virtualization environment under control of a hypervisor. Example virtualization environments and hypervisors include, but are not limited to, Hyper-V and Xen technology virtualization environments and hypervisors. A VM may implement an operating system (OS) supported by the virtualization environment, for example any of various Linux or Microsoft Windows® operating systems, and one or more applications.

The server 380 may be logically attached to one or more virtualized disks or volumes 392 in storage 390 of the client network 370. The volume(s) 392 may be stored according to any of various formats, for example VHD (Virtual Hard Disk) format, VMDK (Virtual Machine Disk) format, and so on. The volume(s) 392 may include at least the data for the OS and application(s) on the server 380.

Systems on the client network 370 may communicate with systems on a provider network 300 via an intermediate network 350 such as the Internet. The provider network 300 may include storage 340, for example implemented by one or more virtualized storage services that provide different types of virtualized storage to customers of the provider network 300 (with a block-based, multitenant, distributed storage service as one example). In some embodiments, a storage service may store virtualized disks or volumes for customers, for example according to a proprietary format of the storage service. In some embodiments, customers may establish private networks on the provider network; for example, the customer associated with client network 370 may establish a client private network 320 on the provider network 300. A client private network 320 may be defined as a network space (e.g., logically defined by an address range or address space) that contains a set of provider network resources (e.g., VMs, virtualized disks or volumes, etc.) of the customer, and that acts as a logically isolated section on the provider network 300 for the customer's resources.

Figure 12:
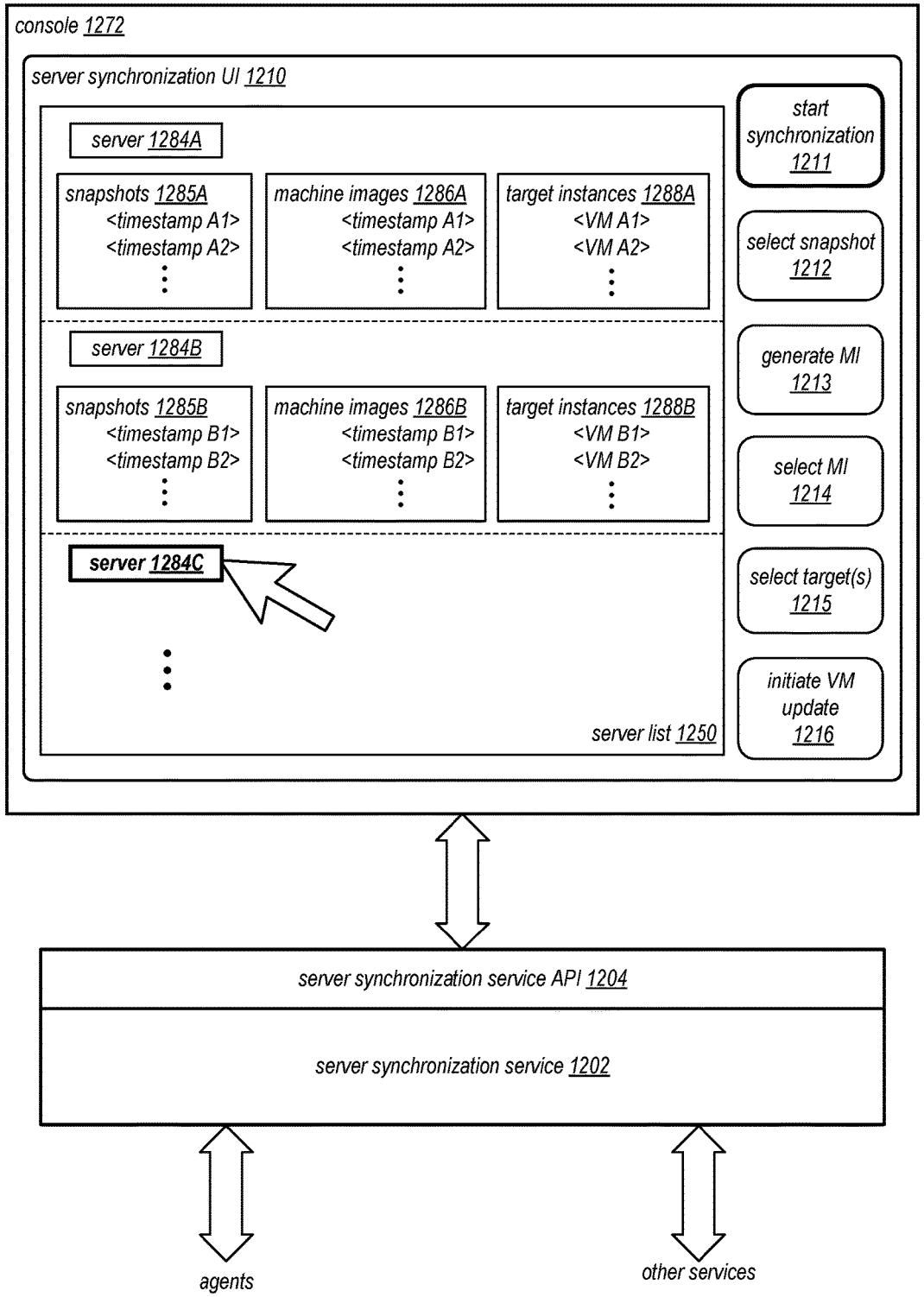
FIG. 12 shows an example user interface to a server synchronization service, according to some embodiments.

As shown in FIG. 3, a server synchronization service 302 may be implemented by one or more devices in the provider network 300. The server synchronization service 302 may provide an application programming interface (API) and user interface(s) that allow a customer to synchronize servers (e.g., server 380) from their client network 370 to their VM(s) 324 on the provider network 300, for example VM(s) 324 in their private network 320 implementations on the provider network 300. FIG. 12 shows an example user interface to a server synchronization service 302, according to some embodiments. A customer may, for example, access the server synchronization service 302 from a console 372 in their client network 370.

Figure 5:
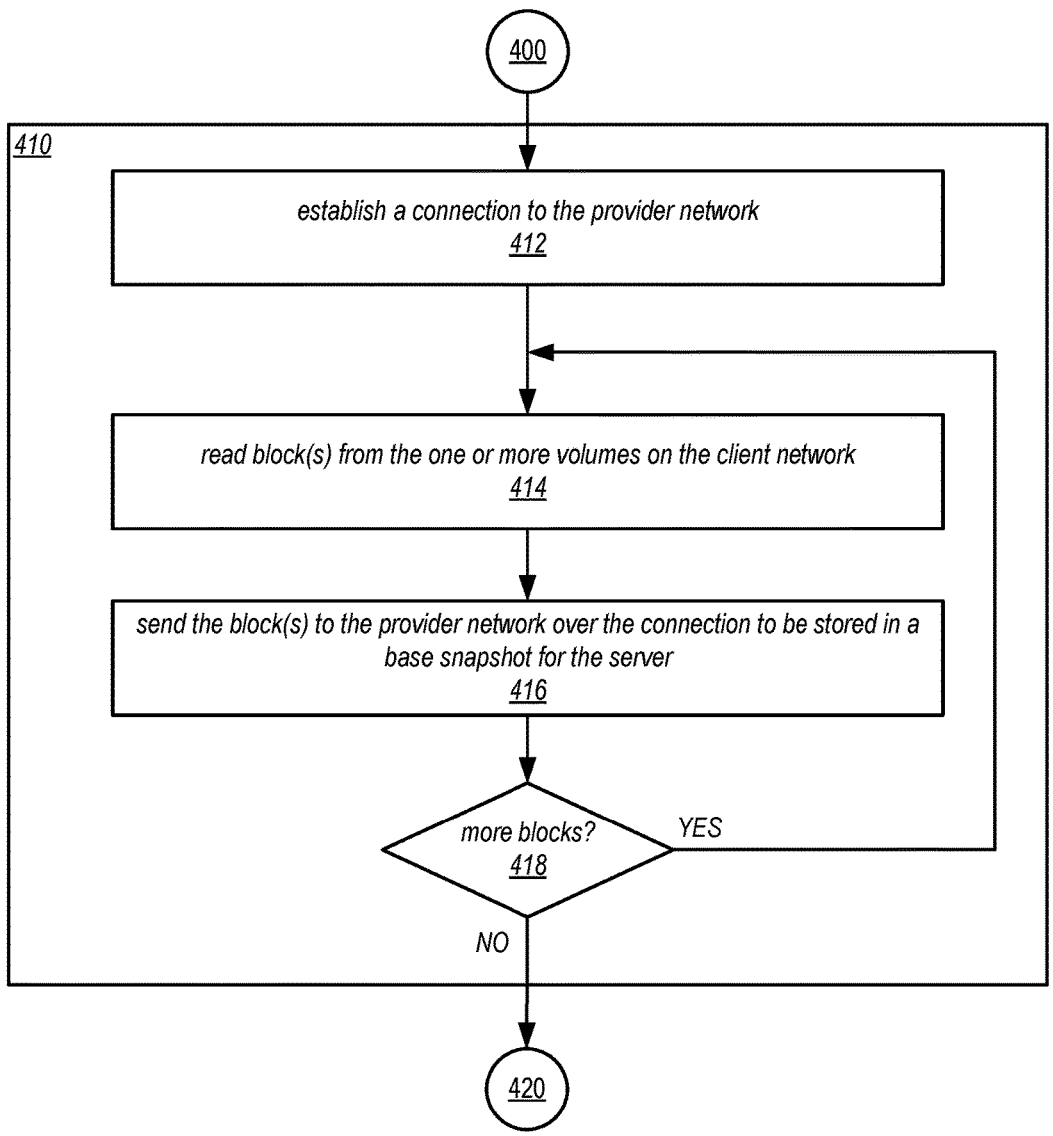
FIG. 5 is a flowchart of a method for initiating synchronization for a server in a client network, according to some embodiments.

One or more block migration agents may be installed on the server in the client network 370. For example, in some embodiments, a kernel agent 332 may be installed at the kernel level of the server 380's operating system (OS), and a block copying agent 334 may be installed in the user space of the OS. In some embodiments, the agents 332 and 334 may be installed on server 380 prior to or during a start synchronization process for the server 380 initiated by the customer via an interface to the server synchronization service 302 displayed on console 372, for example as illustrated in FIG. 12. For example, the agents 332 and 334 may be uploaded to the server 380 from the provider network 300 or from some other source, or may be installed from a storage medium such as a USB key or CD. After the agents 332 and 334 are installed on the server 380, synchronization may be initiated for the server 380. FIG. 5 illustrates a method for initiating synchronization for a server in a client network. In some embodiments, during initiation, a connection 308 may be established between the block copying agent 334 and an MI service 304 on the provider network 300 over an intermediate network 350 such as the Internet. In some embodiments, the network connection 308 may be a high-bandwidth, secure connection, for example according to a secure communication protocol such as HTTPS. In some embodiments, data transfers from the block copying agent 334 to the MI service 304 over connection 308 may be encrypted according to an encryption protocol and/or compressed according to a compression technique. In some embodiments, the client may provide security credentials to be used on the connection 308. In some embodiments, the block copying agent 334 may obtain an encryption protocol from the client, for example a client-specific key-based encryption protocol, which may be used on the connection 308 for data transfers to the MI service 304.

In some embodiments, after the connection 308 is established, the block copying agent 334 on the server 380 may scan the server 380's volume(s) 392 to copy over all content (e.g., all blocks) of the volume(s) 392 to the provider network 300. On the provider network 300, the MI service 304 may store the blocks received from the block copying agent 334 to a storage subsystem 340 on the provider network 300 to generate a base snapshot 342 of the server 380. In some embodiments, if the volume(s) 392 on the client network 370 are stored in a different format than that used on the storage subsystem 340 of the provider network 300, then the block(s) may be converted by the MI service 304 to the format of the storage subsystem 340 prior to storing. In some embodiments, the server 380 may be modified during the scan process when creating the base snapshot 342. In these cases, one or more modified blocks may be identified by the agents 332 and 334 on the server 380 and sent via the connection 308 to the MI service 304 on the provider network 300. The modified blocks may be applied by the MI service 304 to the base snapshot 342 during the scan process or, alternatively, may be applied to generate a new snapshot after the scan is complete.

Figure 4:
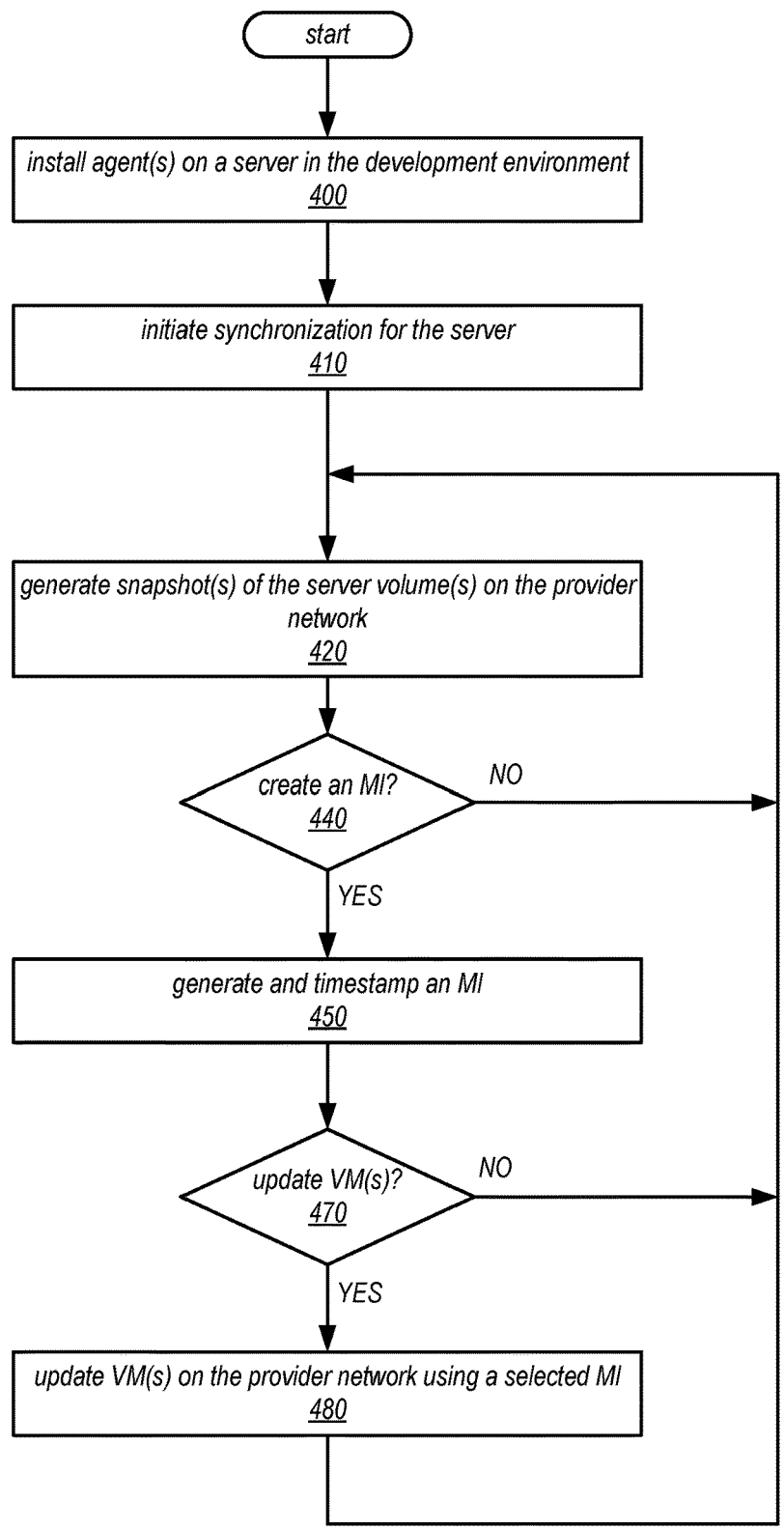
FIG. 4 is a high-level flowchart of a method for continuous block migration from a server to snapshot(s) on a provider network, and for updating VM instances on the provider network using the snapshots, according to some embodiments.

In some embodiments, during or after creation of the base snapshot for the server 380, a continuous block migration method may begin, for example as illustrated at element 420 of FIG. 4. As illustrated in FIG. 3, at (1), changes may be made to the server, for example by users of a development/test system 374 on the client network 370, or by users on other systems. At (2), the changes may generate read and write operations from the server 380 to its attached volume(s) 392. The kernel agent 332 at the OS kernel level may intercept the read and write operations. The changes may include any changes to the server 380's OS, application, and user software and/or data that generate updates, writes, additions, or deletions to content on the server's attached volume(s) 392. At (3), the kernel agent 332 may provide update information to the block copying agent 334. The update information may indicate locations (e.g., volume IDs and byte offsets) and sizes (e.g., number of bytes) of changes made to the volume(s) 392 as detected from the intercepted operations at (2). At (4), the block copying agent 334 may read the modified blocks as indicated by the update information from the volume(s) 392 on the client network 370, and at (5) the block copying agent 334 may send the blocks to the MI service 304 on the provider network 300 over the connection 308. In some embodiments, the block copying agent 334 may send the updated blocks over the connection 308 as they are read from the volume(s) 392. Alternatively, in some embodiments, the block copying agent 334 may collect sets of blocks for several updates, and send the blocks over the connection 308 in batches. In some embodiments, the block copying agent 334 may encrypt and/or compress the blocks before sending the blocks over the connection 308. In some embodiments, the messages that include the updated blocks that are sent over the connection 308 to the MI service 304 may be timestamped and/or stamped with sequence numbers so that the MI service 304 can properly maintain sequencing of the updated blocks when writing the blocks to the current snapshot 342.

At (6) of FIG. 3, the MI service 304 stores the updated blocks received from the block copying agent 334 to a current snapshot 342 for the server 380 on storage subsystem 340. In some embodiments, if the volume(s) 392 are stored in a different format in storage 390 on the client network 370 than the format used on the storage subsystem 340, then the block(s) may be converted to the format of the storage subsystem 340 by the MI service 304 prior to storing the blocks to the storage subsystem 340.

At (7) of FIG. 3, new MIs 344 may be created for the server 380 by the MI service 304 from completed snapshots 342. In some embodiments, the MI service 304 may determine that a current snapshot 342 is complete. For example, an indication that a snapshot 342 is complete may be received from the client via a user interface to a server synchronization service 302, for example as illustrated in FIG. 12. As another example, the snapshot 342 may be completed and a new snapshot 342 may be started according to a schedule, for example once every N (e.g., 8, 12, or 24) hours. As another example, a snapshot 342 may be completed based on an event, such as a notification that a test of the server 380 on the client network 370 has completed successfully. Upon completion of a snapshot 342, the MI service 304 closes and timestamps the current snapshot, starts a new snapshot 342, and begins storing blocks received from the block copying agent 334 to the new snapshot 342. The completed snapshot 342 reflects a point in time state of the volume(s) 392 that are attached to the server 380 on the client network 370.

In some embodiments, the MI service 304 may determine or receive an indication that an MI 344 is to be generated from the completed snapshot 342. In response, the MI service generates a new MI 344 from the completed snapshot 342, and timestamps the MI 344 to indicate its generation time. For example, a new MI 344 may be automatically generated from a snapshot 342 by the MI service 304 upon completion of the snapshot 342. As another example, a new MI 344 may be initiated by the client via a user interface to a server synchronization service 302, for example as illustrated in FIG. 12. As another example, a new MI 344 may be generated according to a schedule, for example once every N (e.g., 8, 12, or 24) hours. As another example, a new MI 344 may be generated based on an event, such as a notification that a test of the server on the client network has completed successfully, and that the current snapshot 342 has been completed. The new MI 344 includes all of the changes to the server 380 that were made from the generation time of the previous MI 344 to the generation time of the new MI 344. In some embodiments, the MI service 304 notifies the client that the new MI 344 is ready, for example via a user interface to the server synchronization service 302 as illustrated in FIG. 12.

Figure 8:
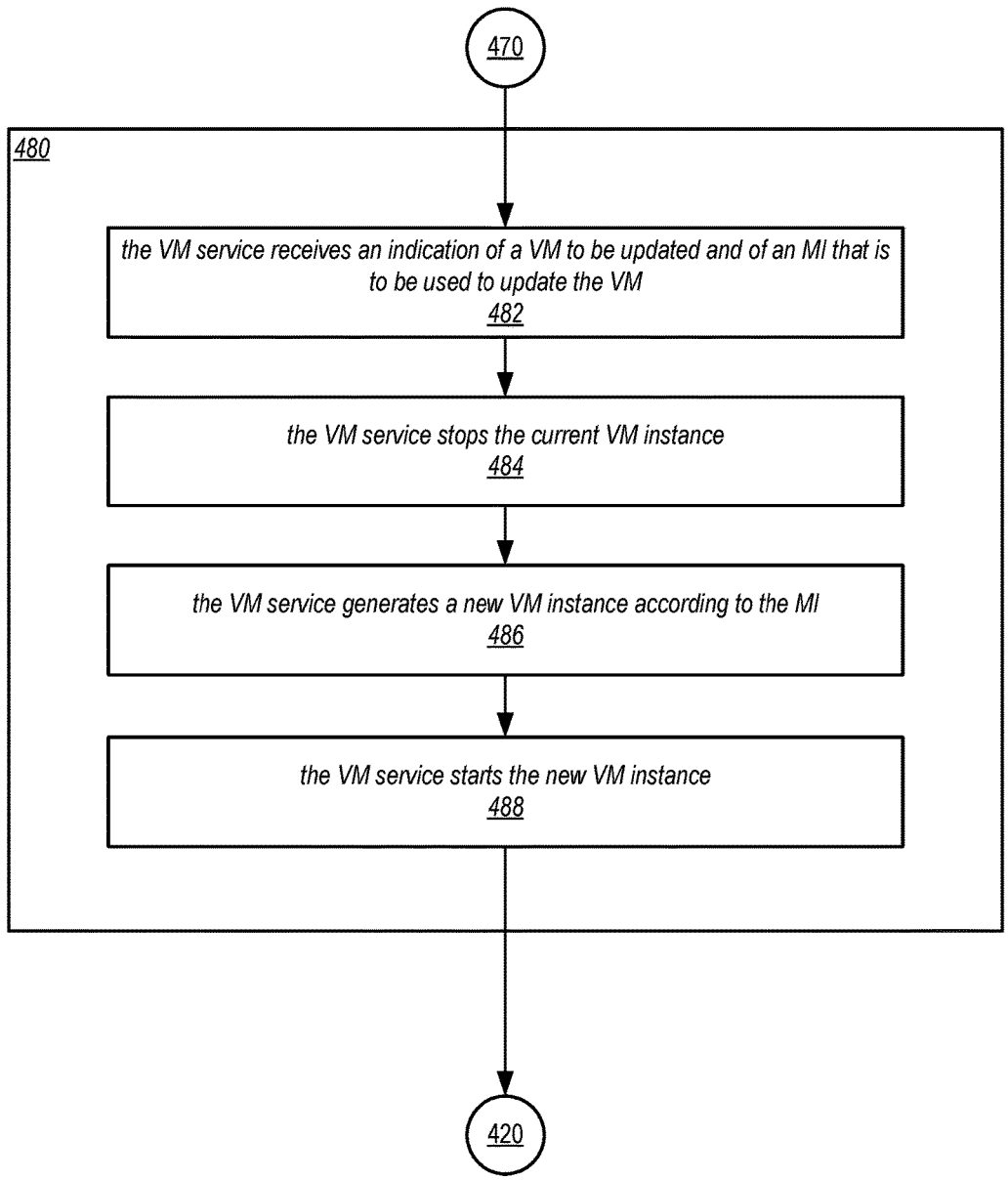
FIG. 8 is a flowchart of a method for updating a VM on the provider network using an MI generated for a server, according to some embodiments.
Figure 9:
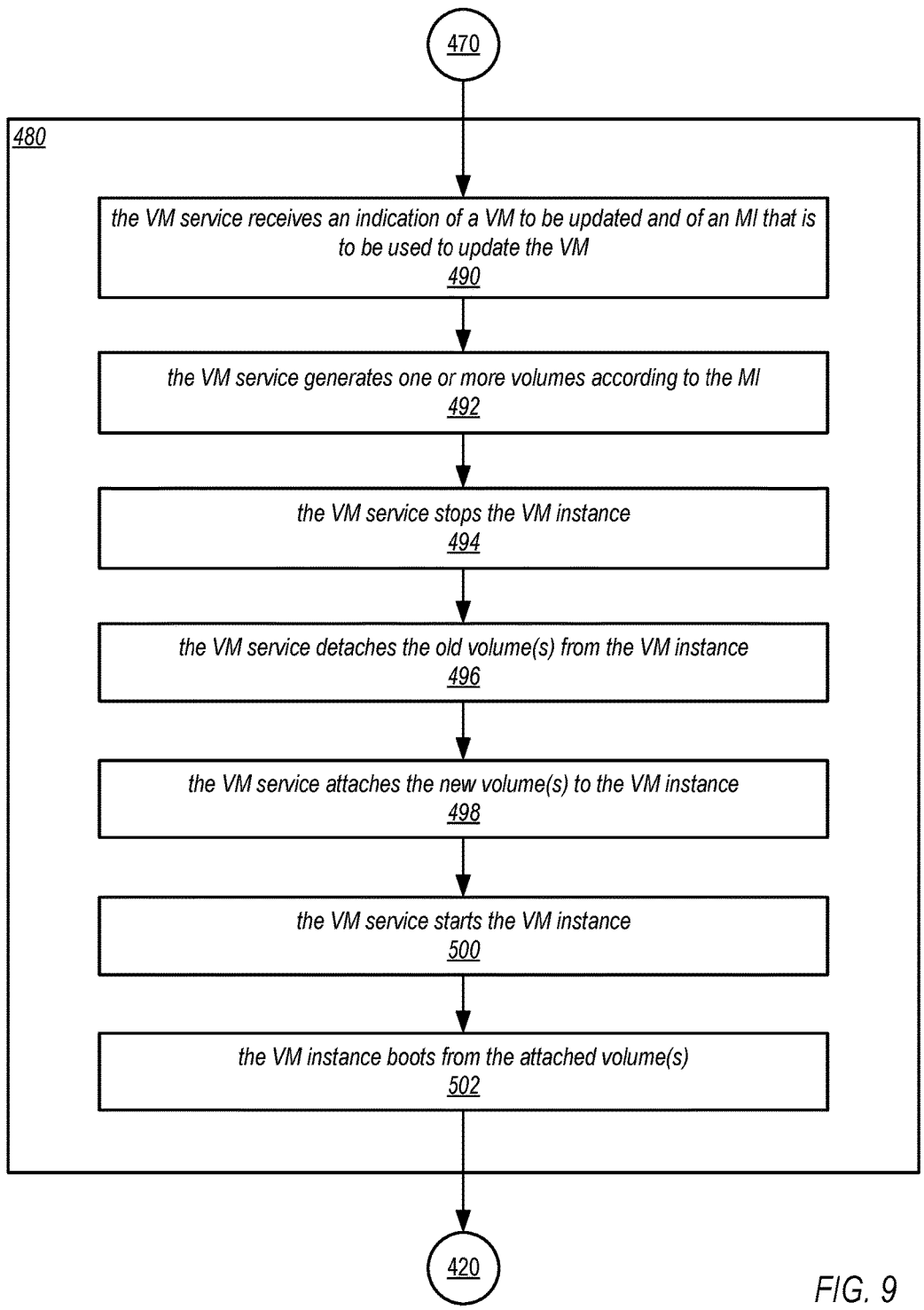
FIG. 9 is a flowchart of an alternative method for updating a VM on the provider network using an MI generated for a server, according to some embodiments.
Figure 10:
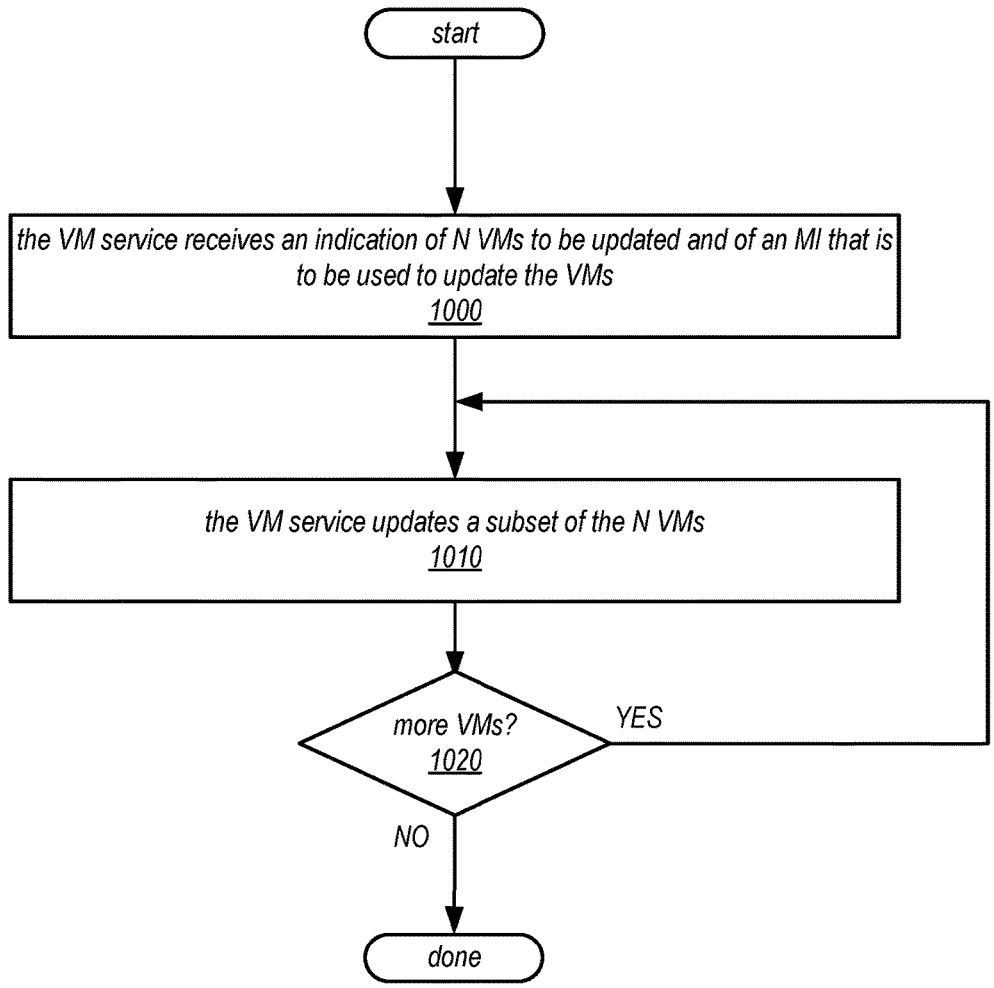
FIG. 10 is a flowchart of a method for updating multiple VMs on the provider network using an MI generated for a server, according to some embodiments.

At (8) of FIG. 3, one or more of the client's VMs 324 on the provider network 370 may be updated by a VM service 306 of the provider network 300 using an MI 344, for example according to one of the methods as illustrated in FIGS. 8, 9, and 10. In some embodiments, the VM service 306 may receive an indication of one or more VMs 324 to be updated, and an indication of an MI 344 that is to be used to update the indicated VMs 324. For example, in some embodiments, the client may select an MI 344 for a server 380, specify one or more VM 324 instances as targets for the update, and initiate the update via a user interface to the server synchronization service 302 as illustrated in FIG. 12.

In some embodiments, to update a VM 324 instance using a selected MI 344, the VM service stops the current VM instance running on a host device in the provider network 300, generates a new VM 324 on a host device in the provider network 300 according to the MI 344, and starts the new VM 324 instance. One or more virtual volumes may be instantiated for the VM in the storage subsystem of the provider network. In some embodiments, the VM service 304 may also further prepare the new VM 324 before starting the instance, for example by adding drivers and other software to the VM 324 that are needed for the VM 324 to execute in the virtualization environment on the host device in the provider network 300. In some embodiments, one or more virtual volumes may be instantiated for the VM 324 in a storage subsystem of the provider network 300 before starting the instance.

In some embodiments, to update a VM 324 instance using a selected MI 344, the VM service 304 may create one or more new virtual volumes on a storage subsystem of the provider network 300 according to the MI 344, stops the VM 324 that is executing in a virtualization environment on a host device in the provider network 300, detaches the old virtual volume(s) from the VM 324, attaches the new virtual volume(s) to the VM 324, and restarts the VM 324 on the host device. The VM 324 then boots from the new virtual volumes.

In some embodiments, a client may select many VM 324 instances (e.g., 100, 1000, etc.) to be updated from a specified MI 344. Rather than taking all of the instances down at one time to perform the update to the new MI 344, the client may prefer to only update a subset of the VM 324 instances at a time. Thus, in some embodiments, the VM service 304 may receive an indication of N VMs 324 to be updated, of an MI 344 that is to be used to update the VMs 324, and of some number of instances that are to be taken out of service for updating at a time. The VM service 304 may then update subsets of the N VMs 324, for example using one of the methods as illustrated in FIGS. 8 and 9, until all N of the client's VMs 324 have been updated.

FIG. 4 is a high-level flowchart of a method for continuous block migration from a server to snapshot(s) on a provider network, and for updating VM instances on the provider network using the snapshots, according to some embodiments. The method of FIG. 4 may, for example, be implemented in the provider network environments as illustrated in FIGS. 1 through 3.

As indicated at 400 of FIG. 4, one or more block migration agents may be installed on a server in the client network. For example, in some embodiments, a kernel agent may be installed at the kernel level of the server's OS, and a block copying agent may be installed in the user space of the server's OS, for example as illustrated in FIG. 3. For example, the agent(s) may be uploaded to the server from the provider network or some other source, or may be installed from a storage medium such as a USB key or CD.

As indicated at 410 of FIG. 4, synchronization may be initiated for the server. FIG. 5 illustrates a method for initiating synchronization for a server in a client network that may be used at element 410 of FIG. 4 in some embodiments. In some embodiments, during initiation, a secure connection may be established between the agent(s) and the provider network, for example to an MI service on the provider network, over an intermediate network such as the Internet. In some embodiments, after the connection is established, a base snapshot of the server to be synchronized may be generated on the provider network.

Figure 6:
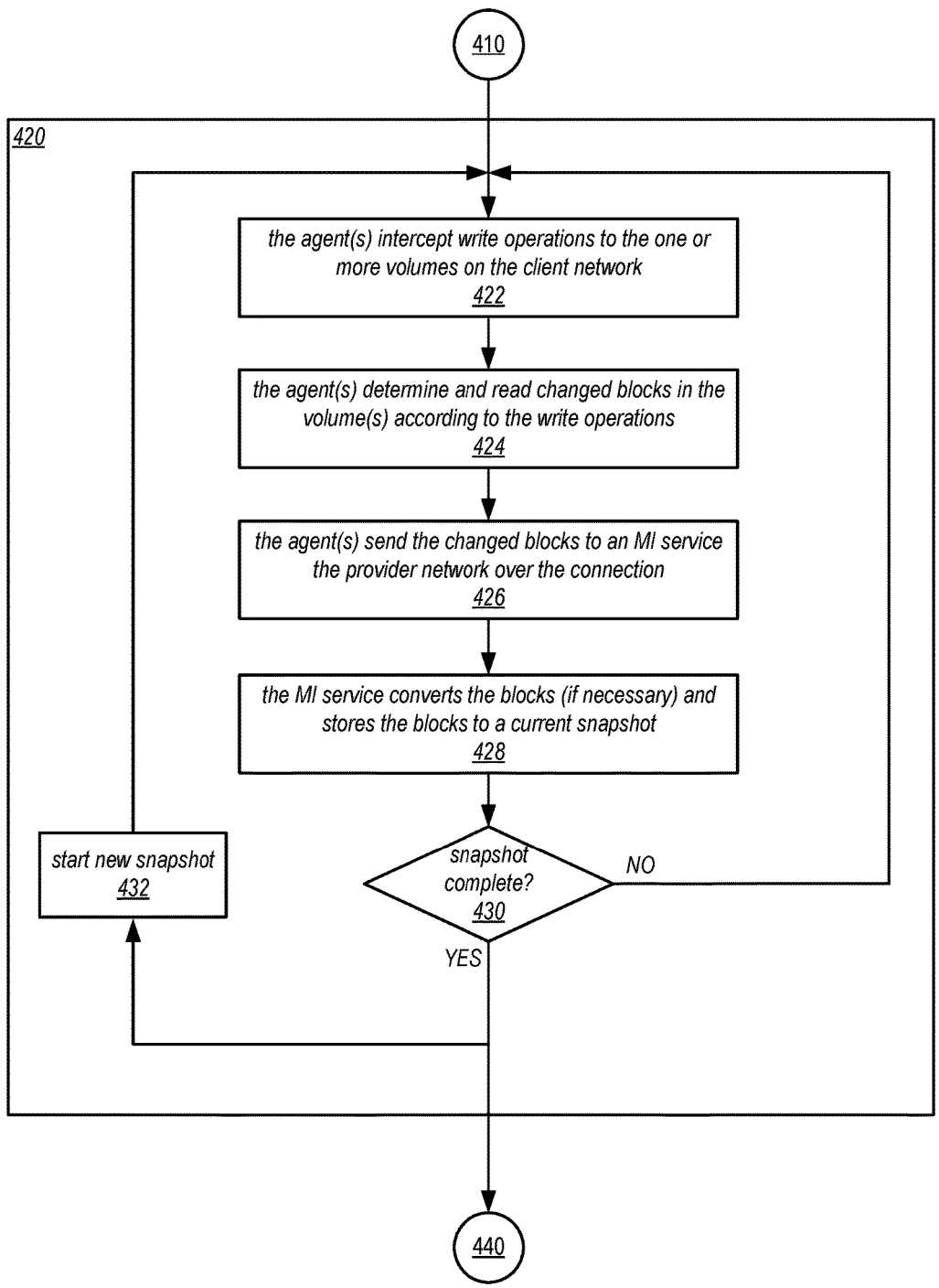
FIG. 6 is a flowchart of a method for continuously migrating blocks from a server's volumes to generate snapshots of the volume(s) on the provider network, according to some embodiments.

As indicated at 420 of FIG. 4, snapshot(s) of the server volume(s) may be created on the provider network. FIG. 6 illustrates a method for continuously migrating blocks from a server's volumes to generate snapshots of the volume(s) on the provider network that may be used at element 420 of FIG. 4 in some embodiments. To generate snapshots, the agent(s) on the server detect changes to the server's attached volumes on the client network and send blocks of data from the volume(s) that are modified by the changes to the provider network over the connection. The changes may include any changes to the server's software and/or data that generate updates, writes, additions, or deletions to content on the server's attached volume(s) 392. In some embodiments, the blocks may be encrypted and/or compressed before sending. On the provider network, the blocks are stored to a current snapshot in a storage subsystem of the provider network. In some embodiments, if the volume(s) are stored in a different format in storage on the client network than the format used on the storage subsystem of the provider network, then the block(s) may be converted to the format of the storage subsystem prior to storing the blocks. At some point, a current snapshot may be determined to be complete. For example, an indication that a snapshot is complete may be received from the client via a user interface to a server synchronization service, for example as illustrated in FIG. 12. As another example, a snapshot may be completed and a new snapshot may be started according to a schedule, for example once every N (e.g., 8, 12, or 24) hours. As another example, a snapshot may be completed based on an event, such as a notification that a test of the server on the client network has completed successfully. Upon completion of a snapshot, the snapshot is closed and timestamped, a new snapshot is started, and blocks received from the agent(s) are stored to the new snapshot. A completed snapshot reflects a point in time state of the volume(s) that are attached to the server on the client network.

Figure 7:
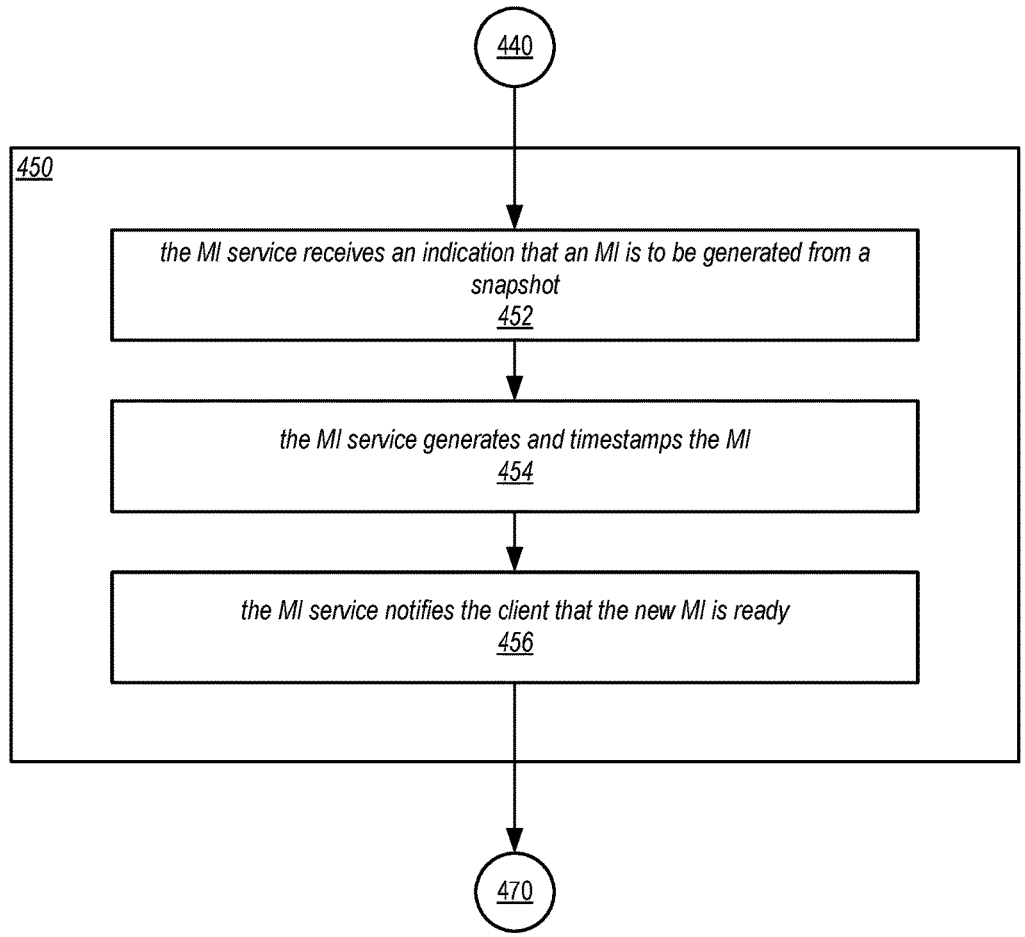
FIG. 7 is a flowchart of a method for generating machine images (MIs) from the snapshots of the server's volume(s), according to some embodiments.

At 440 of FIG. 4, if a machine image (MI) is to be generated for the server, then the method goes to element 450 of FIG. 4. For example, a new MI may be automatically generated from a snapshot upon completion of the snapshot. As another example, a new MI may be initiated by the client via a user interface to a server synchronization service, for example as illustrated in FIG. 12. As another example, a new MI may be generated according to a schedule, for example once every N (e.g., 8, 12, or 24) hours. As another example, a new MI may be generated based on an event, such as a notification that a test of the server on the client network has completed successfully, and that the current snapshot has been completed. As indicated at 450 of FIG. 4, an MI may be generated and timestamped for the server from a completed snapshot, for example from a most recent snapshot. The new MI includes all of the changes to the server that were made from the generation time of the previous MI to the generation time of the new MI. In some embodiments, the client is notified that the new MI is ready, for example via a user interface to a server synchronization service as illustrated in FIG. 12. FIG. 7 illustrates a method for generating machine images (MIs) from the snapshots of the server's volume(s) that may be used at element 450 of FIG. 4 in some embodiments.

At 470 of FIG. 4, if the client's VM instance(s) on the provider network are to be updated, for example as requested by the client via a user interface to a server synchronization service as illustrated in FIG. 12, then the method goes to element 480 of FIG. 4. As indicated at 480 of FIG. 4, the client's VM instance(s) on the provider network may be updated using a selected MI. FIG. 8 illustrates a method for updating a VM on the provider network using an MI generated for a server that may be used at element 470 of FIG. 4 in some embodiments. FIG. 9 illustrates an alternative method for updating a VM on the provider network using an MI generated for a server that may be used at element 470 of FIG. 4 in some embodiments. FIG. 10 illustrates a method for updating multiple VMs on the provider network that may be used at element 470 of FIG. 4 in some embodiments.

FIG. 5 is a flowchart of a method for initiating synchronization for a server in a client network, according to some embodiments. The method of FIG. 5 may, for example, be implemented at element 410 of FIG. 4.

As indicated at 412 of FIG. 5, a connection may be established over an intermediate network from the agent(s) on the server in the client network to the provider network, for example to an MI service on the provider network as illustrated in FIG. 3. In some embodiments, the connection may be a secure connection, for example according to the HTTPS protocol. In some embodiments, the client may provide security credentials to be used on the connection.

In some embodiments, after establishing the connection, the block migration agent(s) on the server may scan the server's volume(s) to copy over all content (e.g., all blocks) of the volume(s) to the provider network. On the provider network, the volume's contents may be stored to a storage subsystem on the provider network to generate a base snapshot of the server. In some embodiments, if the volume(s) on the client network are stored in a different format than that used on the storage subsystem, then the block(s) may be converted to the format of the storage subsystem prior to storing.

In some embodiments, to generate the base snapshot, as indicated at 414 of FIG. 5, an agent installed on the server (e.g., a block copying agent in the user space of the OS as illustrated in FIG. 3) may read block(s) from the one or more volumes on the client network, for example sequentially starting at a first block and proceeding to a last block on each volume attached to the server. As indicated at 416 of FIG. 6, the agent may send the blocks to the provider network, for example to an MI service on the provider network, over the connection to be stored in a base snapshot for the server. In some embodiments, the blocks may be encrypted according to an encryption protocol and/or compressed according to a compression technique by the agent(s) before sending the blocks over the connection. At 418 of FIG. 5, if there are more blocks to be copied for the base snapshot, then the method returns to element 414 of FIG. 5. Otherwise, the base snapshot is done, and is timestamped to indicate its generation time. After finalizing and timestamping the base snapshot, initialization is complete, and the method goes to element 420 of FIG. 4.

In some embodiments, the server may be modified during the scan process when creating the base snapshot of the server. In these cases, one or more modified blocks may be identified by the agents on the server and sent to the provider network. The modified blocks may be applied to the base snapshot during the scan process or, alternatively, may be applied to generate a new snapshot after the scan is complete.

FIG. 6 is a flowchart of a method for continuously migrating blocks from a server's volumes to generate snapshots of the volume(s) on the provider network, according to some embodiments. The method of FIG. 6 may, for example, be implemented at element 420 of FIG. 4.

As indicated at 422 of FIG. 6, the block migration agent(s) installed on the server intercept write operations to the one or more volumes on the client network. For example, in some embodiments, a kernel agent may be installed at the kernel level of the volume's OS as illustrated in FIG. 3, and all read and write operations to the volume(s) may pass through the kernel agent.

As indicated at 424 of FIG. 6, the block migration agent(s) determine and read changed blocks in the volume(s) according to the write operations. For example, in some embodiments, the kernel agent may send update information to a block copying agent installed in the user space of the server's OS, as illustrated in FIG. 3. In some embodiments, the update information may include the location (e.g., offset) and size (e.g., in bytes) of changes to the server's volume(s) as indicated by write operations intercepted by the kernel agent.

As indicated at 426 of FIG. 6, the block migration agent(s) send the changed blocks to an MI service the provider network over the connection. For example, in some embodiments, the block copying agent may read blocks that include changes as indicated by the update information from the volume(s) on the client network, and send the blocks to the MI server over the connection. In some embodiments, the blocks may be encrypted according to an encryption protocol and/or compressed according to a compression technique by the agent(s) before sending the blocks over the connection. In some embodiments, the messages that include the updated blocks that are sent over the connection to the MI service may be timestamped and/or stamped with sequence numbers so that the MI service can properly maintain sequencing of the updated blocks when writing the blocks to a current snapshot.

As indicated at 428 of FIG. 6, the MI service may store the blocks it receives from the block migration agent(s) via the connection to a current snapshot on a storage subsystem of the provider network. In some embodiments, the MI service may convert the blocks to a format used on the storage subsystem of the provider network, if necessary.

At 430 of FIG. 6, if the MI service determines or receives an indication that the current snapshot is complete, then at 432 the MI service starts a new snapshot as indicated at 432, and the method returns to element 422 to begin storing blocks received from the agent(s) to the new snapshot. The completed snapshot reflects a point in time state of the volume(s) that are attached to the server on the client network that is being synchronized to the provider network. The completed snapshot is made available to be used to generate a new machine image (MI) for the server at element 440 of FIG. 4. At 430 of FIG. 6, if the current snapshot is not complete, then the method returns to element 422 to continue storing blocks received from the agent(s) to the current snapshot.

FIG. 7 is a flowchart of a method for generating machine images (MIs) from the snapshots of the server's volume(s), according to some embodiments. The method of FIG. 7 may, for example, be implemented at element 450 of FIG. 4.

As indicated at 452 of FIG. 7, the MI service may receive an indication that an MI is to be generated from a snapshot. For example, an MI may be initiated by the client via a user interface to a server synchronization service, for example as illustrated in FIG. 12. As another example, MIs may be generated according to a schedule, for example once every N (e.g., 8, 12, or 24) hours. As another example, MIs may be generated based on an event, such as a notification that a test of the server on the client network has completed successfully, and that the current snapshot reflecting the changes made to the server prior to the test cycle is complete.

As indicated at 454 of FIG. 7, in response to the indication that an MI is to be generated from a snapshot, the MI service generates a new MI from the current snapshot, and timestamps the MI to indicate its generation time. The new MI includes all of the changes to the server that were made from the generation time of the previous MI to the generation time of the new MI. As indicated at 456 of FIG. 7, the MI service may notify the client that the new MI is ready, for example via a user interface to a server synchronization service, for example as illustrated in FIG. 12

FIG. 8 is a flowchart of a method for updating a VM on the provider network using an MI generated for a server, according to some embodiments. The method of FIG. 8 may, for example, be implemented at element 480 of FIG. 4.

As indicated at 482 of FIG. 8, the VM service receives an indication of a VM to be updated and of an MI that is to be used to update the VM. As indicated at 484 of FIG. 8, the VM service stops the current VM instance running on a host device in the provider network. As indicated at 486 of FIG.

8, the VM service generates a new VM instance according to the MI. One or more virtual volumes may be instantiated for the VM in the storage subsystem of the provider network. In some embodiments, the VM service may also further prepare the VM instance, for example by adding drivers and other software to the VM that are needed for the VM to execute in the virtualization environment on the host device in the provider network. As indicated at 488 of FIG. 8, the VM service starts the new VM instance. The VM instance then boots off of its volume(s) in the provider network.

FIG. 9 is a flowchart of an alternative method for updating a VM on the provider network using an MI generated for a server, according to some embodiments. The method of FIG. 8 may, for example, be implemented at element 480 of FIG. 4.

As indicated at 490 of FIG. 9, the VM service receives an indication of a VM to be updated and of an MI that is to be used to update the VM. As indicated at 492 of FIG. 9, the VM service may create one or more new virtual volumes on the storage subsystem of the provider network according to the MI. As indicated at 494 of FIG. 9, the VM service stops the VM instance that is currently executing in a virtualization environment on a host device in the provider network. As indicated at 496 of FIG. 9, the VM service detaches the old virtual volume(s) from the VM instance. As indicated at 498 of FIG. 9, the VM service attaches the new virtual volume(s) that were created at element 492 to the VM instance. As indicated at 500 of FIG. 9, the VM service starts the VM instance that was stopped at element 494 of FIG. 9. As indicated at 502 of FIG. 9, the VM instance boots from the attached virtual volume(s).

FIG. 10 is a flowchart of a method for updating multiple VMs on the provider network using an MI generated for a server, according to some embodiments. A client may have many instances (e.g., 100, 1000, etc.) of VMs in their provider network implementation (e.g., private network) that implement the functionality of the server. Rather than taking all of the instances down to do the update to the new version of the server, the client may prefer to only update a subset of the VM instances at a time.

As indicated at 1000 of FIG. 10, the VM service receives an indication of N VMs to be updated and of an MI that is to be used to update the VMs. As indicated at 1010 of FIG. 10, the VM service updates a subset of the N VMs, for example using one of the methods as illustrated in FIGS. 8 and 9. At 1020 of FIG. 10, if there are more VMs to be updated, then the method returns to element 1010. Otherwise, all N of the client's VMs have been updated.

Figure 11:
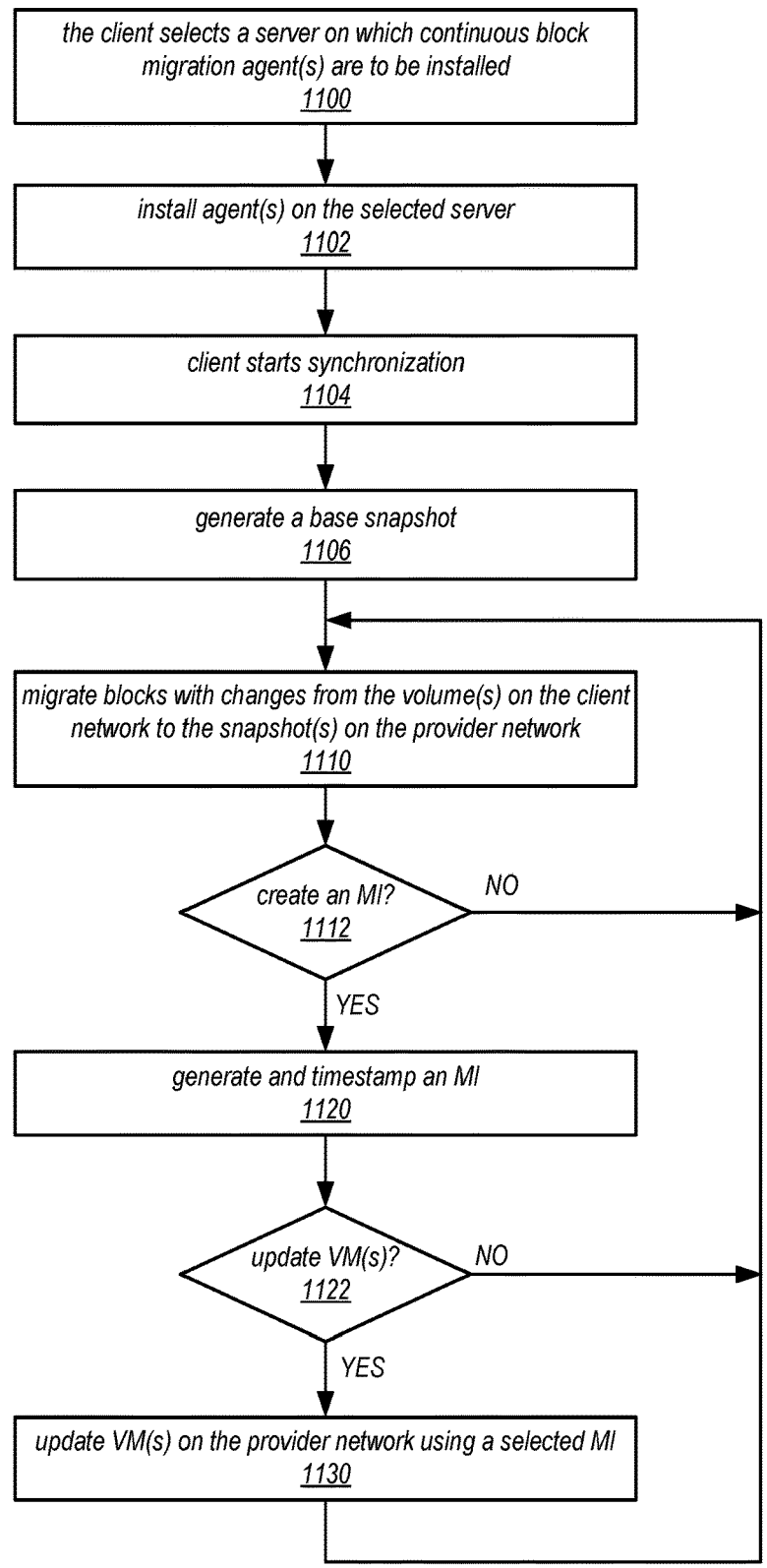
FIG. 11 is a flowchart of a method for a client to update VM instances on the provider network for a server, according to some embodiments.

FIG. 11 is a flowchart of a method for a client to update VM instances on the provider network for a server, according to some embodiments. The method of FIG. 11 may, for example, be implemented in the provider network environments as illustrated in FIGS. 1 through 3.

As indicated at 1100 of FIG. 11, a client selects a server on the client network on which continuous block migration agent(s) are to be installed. For example, a server may be selected by the client via a user interface to a server synchronization service, for example as illustrated in FIG. 12.

As indicated at 1102 of FIG. 11, one or more block migration agents may be installed on a server in the client network. For example, in some embodiments, a kernel agent may be installed at the kernel level of the server's OS, and a block copying agent may be installed in the user space of the server's OS, for example as illustrated in FIG. 3. For example, the agent(s) may be uploaded to the server from the provider network or some other source, or may be installed from a storage medium such as a USB key or CD.

As indicated at 1104 of FIG. 11, the client may start synchronization for the server. For example, synchronization for the server may be initiated by the client via a user interface to a server synchronization service, for example as illustrated in FIG. 12. In some embodiments, during initiation, a secure connection may be established between the agent(s) and the provider network, for example to an MI service on the provider network, over an intermediate network such as the Internet. In some embodiments, after the connection is established, a base snapshot of the server to be synchronized may be generated on the provider network. As indicated at 1106 of FIG. 11, a base snapshot may be generated for the server, for example according to the method as illustrated in FIG. 5.

Elements 1110 through 1130 of FIG. 11 correspond to the continuous block migration process.

As indicated at 1110 of FIG. 11, the block migration agents may communicate with the service(s) on the provider network to migrate blocks that include changes to the server on the client network from the volume(s) on the client network to the snapshot(s) on the provider network. FIG. 6 illustrates a method for continuously migrating changed blocks from the client network to snapshot(s) on the provider network according to some embodiments.

At 1112 of FIG. 11, if a machine image (MI) is to be generated for the server, then the method goes to element 1120 of FIG. 11. As indicated at 1120 of FIG. 11, an MI may be generated and timestamped for the server, for example according to a most recent snapshot. FIG. 7 illustrates a method for generating machine images (MIs) from the snapshots of the server's volume(s) that may be used at element 1120 of FIG. 11 in some embodiments.

At 1122 of FIG. 11, if the client's VM instance(s) on the provider network are to be updated, then the method goes to element 1130 of FIG. 11. For example, the client may select an MI, select one or more VMs to be updated with the MI, and initiate the update via a user interface to a server synchronization service as illustrated in FIG. 12 As indicated at 1130 of FIG. 11, the client's VM instance(s) on the provider network may be updated using the selected MI. FIG. 8 illustrates a method for updating a VM on the provider network using an MI generated for a server that may be used at element 1130 of FIG. 11 in some embodiments. FIG. 9 illustrates an alternative method for updating a VM on the provider network using an MI generated for a server that may be used at 1130 of FIG. 11 in some embodiments. FIG. 10 illustrates a method for updating multiple VMs on the provider network that may be used at element 1130 of FIG. 11 in some embodiments.

FIG. 12 shows an example user interface to a server synchronization service, according to some embodiments. As shown in FIG. 12, a provider network 1200 may include a server synchronization service 1202 and an application programming interface (API) 1204 to the server synchronization service 1202. A client network may include a console 1272, for example implemented on a device as illustrated in FIG. 17. The server synchronization service 1202 may provide a user interface (UI) 1210 via the console 1272 that exposes functionality of the server synchronization service 1202 to the client via one or more user interface elements.

In some embodiments, the server synchronization UI 1210 may include a server list 1250 that graphically or textually shows one or more servers 1284 on the client network 1270 that may be candidates for synchronization, or that are currently in the process of being synchronized to the provider network. Information about the server(s) 1284 may, for example, be collected by the synchronization agent(s) installed on the server in the client network 1270 and provided to the server synchronization service 1202, which may then display at least some of the information in server list 1250. The servers 1284 may be VM instances in a virtualization environment on a host machine in the client network 1270 in which synchronization agent(s) are installed, host devices that implement a virtualization environment in which one or more VMs are instantiated, and/or physical server devices on the client network. In some embodiments, the user may select a server 1284 from the list 1250 to perform one or more synchronization functions for the selected server 1284. In some embodiments, synchronization information may be displayed for each server 1284. The synchronization information for a server 1284 may, for example, indicate that synchronization agent(s) have or have not been installed, and, if installed, that synchronization has or has not been initiated. Note that two or more servers 1284 may be in the process of synchronization at the same time.

In some embodiments, for servers 1284 for which synchronization has been initiated (e.g., servers 1284A and 1284B), the server synchronization UI 1210 may provide UI elements such as graphical or textual lists of snapshots 1285, machine images 1286 that have been generated from snapshots 1285, and target instances 1288 that can be updated with the machine images 1286. Information, including but not limited to timestamps, may be provided for the snapshots 1285, machine images 1286, and target instances 1288. In some embodiments, the lists 1285, 1286, and 1288 may be interactive, allowing the user to select items in the list to perform synchronization operations with the selected item(s) and/or to obtain additional information about the selected item(s). For example, the user may select a current/open snapshot from 1285 to close/complete the snapshot, or select a snapshot from 1285 to generate a machine image (MI) from the snapshot. As another example, the user may select an MI from 1286 to update one or more VM(s), and select one or more VM(s) from 1288 as targets for the update.

In some embodiments, the synchronization UI 1210 may provide one or more user interface elements, for example buttons and menus, for configuring and managing synchronizations. In some embodiments, the UI 1210 may include a start synchronization agent 1211 UI element that allows the user to start synchronization for a selected server or servers (e.g., server 1284C in FIG. 12). In some embodiments, starting synchronization for a selected server or servers may initiate the synchronization process for each selected server, for example as illustrated in FIG. 4. In some embodiments, the UI 1210 may include a select snapshot 1212 UI element for selecting a snapshot; a generate MI 1213 UI element for generating an MI from a selected snapshot, for example as illustrated in FIG. 7; a select MI 1214 UI element for selecting an MI; a select targets 1215 UI element for selecting target instances to be updated with a selected MI; and/or an initiate VM update 1216 UI element for starting a VM update process, for example as illustrated in FIG. 8, 9, or 10.

Example Provider Network Environments

This section describes example provider network environments in which embodiments of the methods and apparatus for synchronizing servers using continuous block migration in provider network environments as described in reference to FIGS. 1 through 12 may be implemented. However, these example provider network environments are not intended to be limiting.

Figure 13:
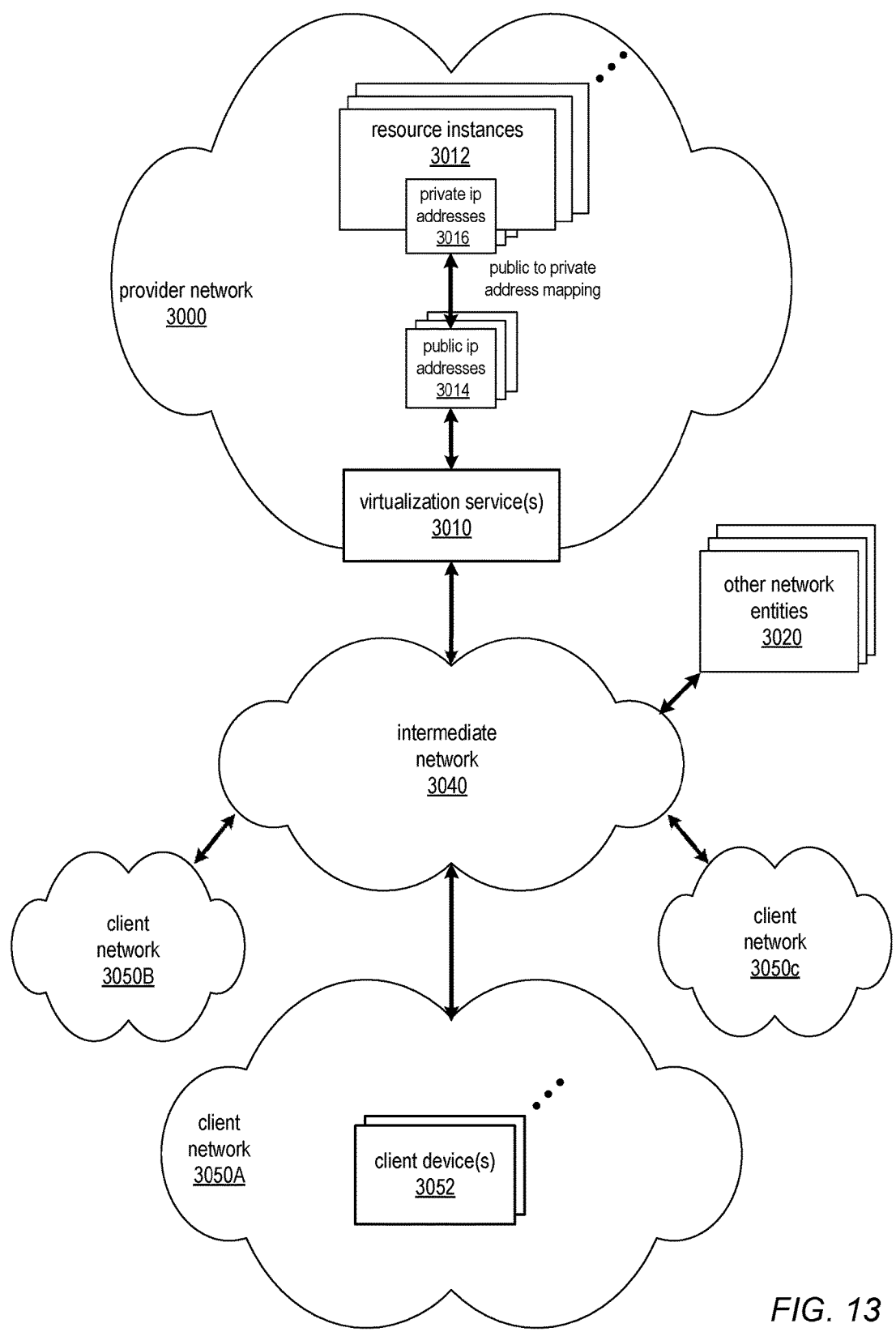
FIG. 13 illustrates an example provider network environment, according to some embodiments.

FIG. 13 illustrates an example provider network environment, according to some embodiments. A provider network 3000 may provide resource virtualization to clients via one or more virtualization services 3010 that allow clients to purchase, rent, or otherwise obtain instances 3012 of virtualized resources, including but not limited to computation and storage resources, implemented on devices within the provider network or networks in one or more data centers. Private IP addresses 3016 may be associated with the resource instances 3012; the private IP addresses are the internal network addresses of the resource instances 3012 on the provider network 3000. In some embodiments, the provider network 3000 may also provide public IP addresses 3014 and/or public IP address ranges (e.g., Internet Protocol version 4 (IPv4) or Internet Protocol version 6 (IPv6) addresses) that clients may obtain from the provider 3000.

Conventionally, the provider network 3000, via the virtualization services 3010, may allow a client of the service provider (e.g., a client that operates client network 3050A) to dynamically associate at least some public IP addresses 3014 assigned or allocated to the client with particular resource instances 3012 assigned to the client. The provider network 3000 may also allow the client to remap a public IP address 3014, previously mapped to one virtualized computing resource instance 3012 allocated to the client, to another virtualized computing resource instance 3012 that is also allocated to the client. Using the virtualized computing resource instances 3012 and public IP addresses 3014 provided by the service provider, a client of the service provider such as the operator of client network 3050A may, for example, implement client-specific applications and present the client's applications on an intermediate network 3040, such as the Internet. Other network entities 3020 on the intermediate network 3040 may then generate traffic to a destination public IP address 3014 published by the client network 3050A; the traffic is routed to the service provider data center, and at the data center is routed, via a network substrate, to the private IP address 3016 of the virtualized computing resource instance 3012 currently mapped to the destination public IP address 3014. Similarly, response traffic from the virtualized computing resource instance 3012 may be routed via the network substrate back onto the intermediate network 3040 to the source entity 3020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 3000; a client may then assign their allocated public IP addresses to particular resource instances allocated to the client. These public IP addresses may be referred to as client public IP addresses, or simply client IP addresses. Instead of being assigned by the provider network 3000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 14:
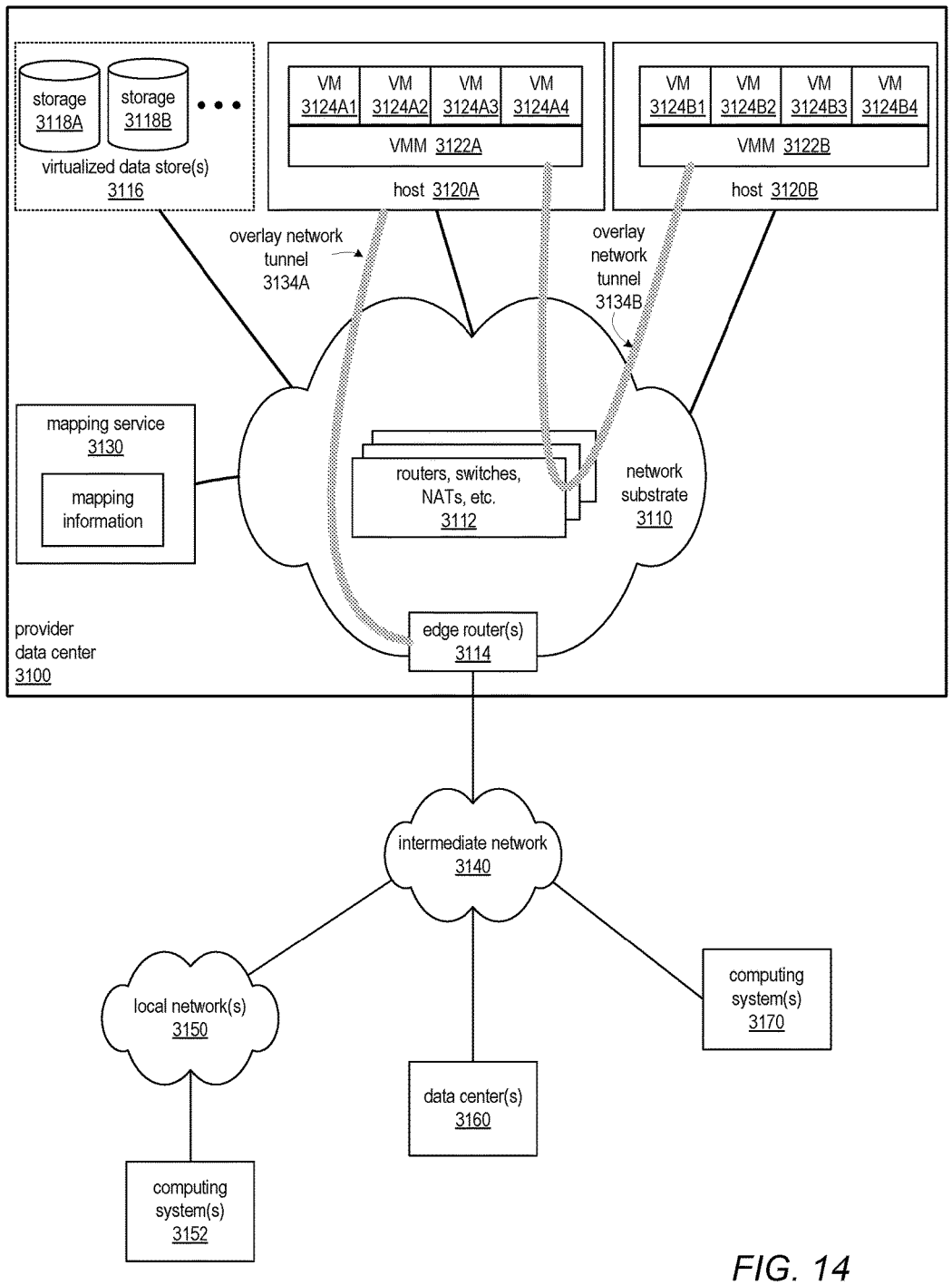
FIG. 14 illustrates an example data center that implements an overlay network on a network substrate using IP tunneling technology, according to some embodiments.

FIG. 14 illustrates an example data center that implements an overlay network on a network substrate using IP tunneling technology, according to some embodiments. A provider data center 3100 may include a network substrate that includes networking devices 3112 such as routers, switches, network address translators (NATs), and so on. Some embodiments may employ an Internet Protocol (IP) tunneling technology to provide an overlay network via which encapsulated packets may be passed through network substrate 3110 using tunnels. The IP tunneling technology may provide a mapping and encapsulating system for creating an overlay network on a network (e.g., a local network in data center 3100 of FIG. 14) and may provide a separate namespace for the overlay layer (the public IP addresses) and the network substrate 3110 layer (the private IP addresses). Packets in the overlay layer may be checked against a mapping directory (e.g., provided by mapping service 3130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 3130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 14, an example overlay network tunnel 3134A from a virtual machine (VM) 3124A on host 3120A to a device on the intermediate network 3150 and an example overlay network tunnel 3134B between a VM 3124B on host 3120B and a VM 3124C on host 3120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 14, at least some networks in which embodiments may be implemented may include hardware virtualization technology that enables multiple operating systems to run concurrently on a host computer (e.g., hosts 3120A and 3120B of FIG. 14), i.e. as virtual machines (VMs) 3124 on the hosts 3120. The VMs 3124 may, for example, be rented or leased to clients of a network provider. A hypervisor, or virtual machine monitor (VMM) 3122, on a host 3120 presents the VMs 3124 on the host with a virtual platform and monitors the execution of the VMs 3124. Each VM 3124 may be provided with one or more private IP addresses; the VMM 3122 on a host 3120 may be aware of the private IP addresses of the VMs 3124 on the host. A mapping service 3130 may be aware of all network IP prefixes and the IP addresses of routers or other devices serving IP addresses on the local network. This includes the IP addresses of the VMMs 3122 serving multiple VMs 3124. The mapping service 3130 may be centralized, for example on a server system, or alternatively may be distributed among two or more server systems or other devices on the network. A network may, for example, use the mapping service technology and IP tunneling technology to, for example, route data packets between VMs 3124 on different hosts 3120 within the data center 3100 network; note that an interior gateway protocol (IGP) may be used to exchange routing information within such a local network.

In addition, a network such as the provider data center 3100 network (which is sometimes referred to as an autonomous system (AS)) may use the mapping service technology, IP tunneling technology, and routing service technology to route packets from the VMs 3124 to Internet destinations, and from Internet sources to the VMs 3124. Note that an external gateway protocol (EGP) or border gateway protocol (BGP) is typically used for Internet routing between sources and destinations on the Internet. FIG. 14 shows an example provider data center 3100 implementing a network that provides resource virtualization technology and that provides full Internet access via edge router(s) 3114 that connect to Internet transit providers, according to some embodiments. The provider data center 3100 may, for example, provide clients the ability to implement virtual computing systems (VMs 3124) via a hardware virtualization service and the ability to implement virtualized data stores 3116 on storage resources 3118 via a storage virtualization service.

The data center 3100 network may implement IP tunneling technology, mapping service technology, and a routing service technology to route traffic to and from virtualized resources, for example to route packets from the VMs 3124 on hosts 3120 in data center 3100 to Internet destinations, and from Internet sources to the VMs 3124. Internet sources and destinations may, for example, include computing systems 3170 connected to the intermediate network 3140 and computing systems 3152 connected to local networks 3150 that connect to the intermediate network 3140 (e.g., via edge router(s) 3114 that connect the network 3150 to Internet transit providers). The provider data center 3100 network may also route packets between resources in data center 3100, for example from a VM 3124 on a host 3120 in data center 3100 to other VMs 3124 on the same host or on other hosts 3120 in data center 3100.

A service provider that provides data center 3100 may also provide additional data center(s) 3160 that include hardware virtualization technology similar to data center 3100 and that may also be connected to intermediate network 3140. Packets may be forwarded from data center 3100 to other data centers 3160, for example from a VM 3124 on a host 3120 in data center 3100 to another VM on another host in another, similar data center 3160, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 3118, as virtualized resources to clients of a network provider in a similar manner.

Figure 15:
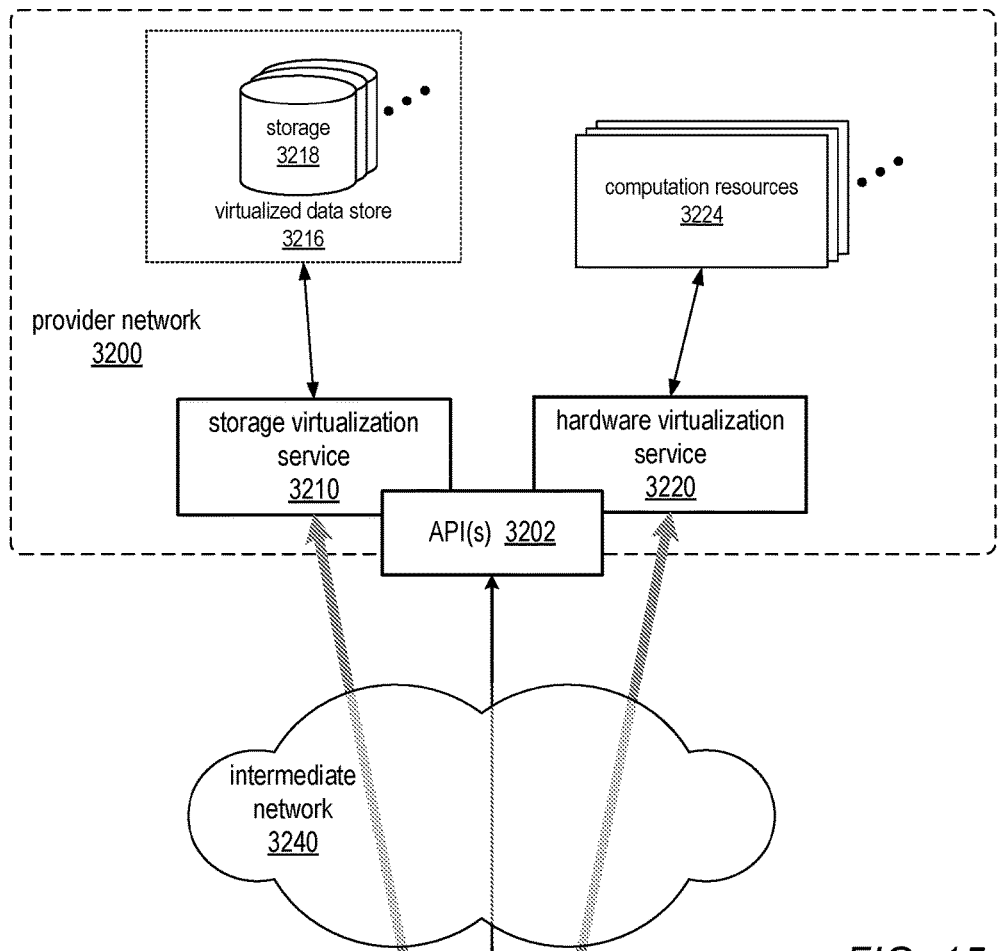
FIG. 15 is a block diagram of an example provider network that provides a storage virtualization service and a hardware virtualization service to clients, according to some embodiments.
Figure 15:
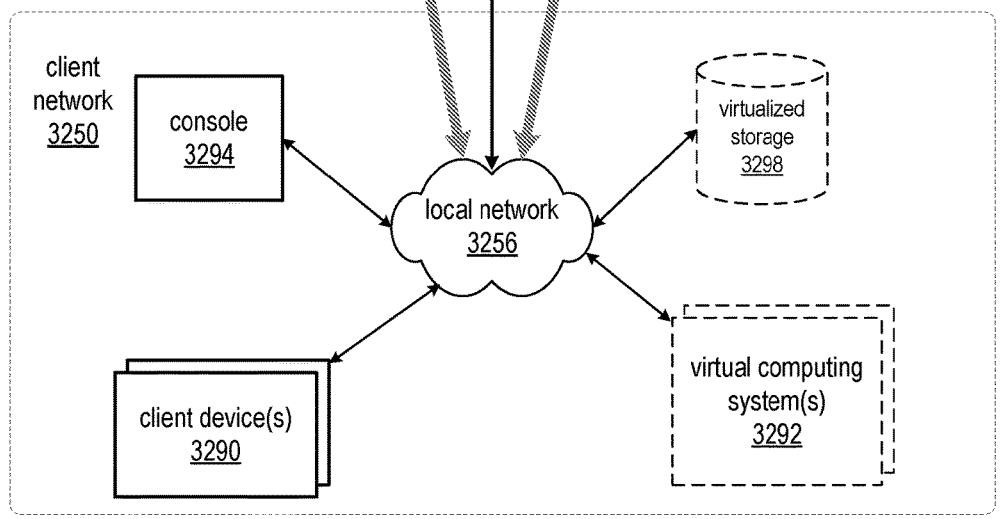

FIG. 15 is a block diagram of an example provider network that provides a storage virtualization service and a hardware virtualization service to clients, according to some embodiments. Hardware virtualization service 3220 provides multiple computation resources 3224 (e.g., VMs) to clients. The computation resources 3224 may, for example, be rented or leased to clients of the provider network 3200 (e.g., to a client that implements client network 3250). Each computation resource 3224 may be provided with one or more private IP addresses. Provider network 3200 may be configured to route packets from the private IP addresses of the computation resources 3224 to public Internet destinations, and from public Internet sources to the computation resources 3224.

Provider network 3200 may provide a client network 3250, for example coupled to intermediate network 3240 via local network 3256, the ability to implement virtual computing systems 3292 via hardware virtualization service 3220 coupled to intermediate network 3240 and to provider network 3200. In some embodiments, hardware virtualization service 3220 may provide one or more APIs 3202, for example a web services interface, via which a client network 3250 may access functionality provided by the hardware virtualization service 3220, for example via a console 3294. In some embodiments, at the provider network 3200, each virtual computing system 3292 at client network 3250 may correspond to a computation resource 3224 that is leased, rented, or otherwise provided to client network 3250.

From an instance of a virtual computing system 3292 and/or another client device 3290 or console 3294, the client may access the functionality of storage virtualization service 3210, for example via one or more APIs 3202, to access data from and store data to a virtual data store 3216 provided by the provider network 3200. In some embodiments, a virtualized data store gateway (not shown) may be provided at the client network 3250 that may locally cache at least some data, for example frequently accessed or critical data, and that may communicate with virtualized data store service 3210 via one or more communications channels to upload new or modified data from a local cache so that the primary store of data (virtualized data store 3216) is maintained. In some embodiments, a user, via a virtual computing system 3292 and/or on another client device 3290, may mount and access virtual data store 3216 volumes, which appear to the user as local virtualized storage 3298.

While not shown in FIG. 15, the virtualization service(s) may also be accessed from resource instances within the provider network 3200 via API(s) 3202. For example, a client, appliance service provider, or other entity may access a virtualization service from within a respective private network on the provider network 3200 via an API 3202 to request allocation of one or more resource instances within the private network or within another private network.

Figure 16:
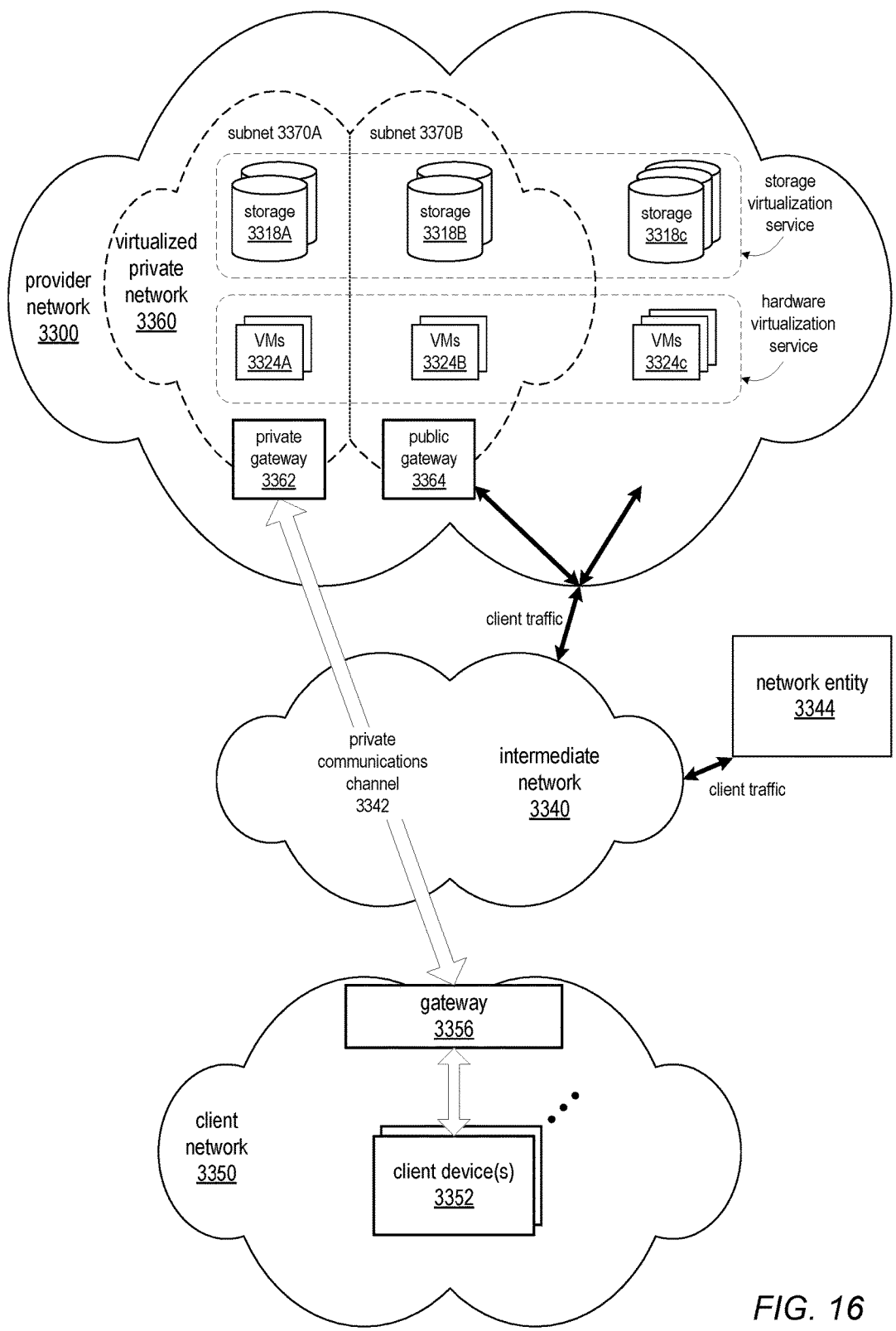
FIG. 16 illustrates an example provider network that provides virtualized private networks to at least some clients, according to some embodiments.

FIG. 16 illustrates an example provider network that provides private networks on the provider network to at least some clients, according to some embodiments. A client's virtualized private network 3360 on a provider network 3300, for example, enables a client to connect their existing infrastructure (e.g., devices 3352) on client network 3350 to a set of logically isolated resource instances (e.g., VMs 3324A and 3324B and storage 3318A and 3318B), and to extend management capabilities such as security services, firewalls, and intrusion detection systems to include their resource instances.

A client's virtualized private network 3360 may be connected to a client network 3350 via a private communications channel 3342. A private communications channel 3342 may, for example, be a tunnel implemented according to a network tunneling technology or some other technology over an intermediate network 3340. The intermediate network may, for example, be a shared network or a public network such as the Internet. Alternatively, a private communications channel 3342 may be implemented over a direct, dedicated connection between virtualized private network 3360 and client network 3350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtualized private network 3360 for a client on provider network 3300, one or more resource instances (e.g., VMs 3324A and 3324B and storage 3318A and 3318B) may be allocated to the virtualized private network 3360. Note that other resource instances (e.g., storage 3318C and VMs 3324C) may remain available on the provider network 3300 for other client usage. A range of public IP addresses may also be allocated to the virtualized private network 3360. In addition, one or more networking devices (routers, switches, etc.) of the provider network 3300 may be allocated to the virtualized private network 3360. A private communications channel 3342 may be established between a private gateway 3362 at virtualized private network 3360 and a gateway 3356 at client network 3350.

In some embodiments, in addition to, or instead of, a private gateway 3362, virtualized private network 3360 may include a public gateway 3364 that enables resources within virtualized private network 3360 to communicate directly with entities (e.g., network entity 3344) via intermediate network 3340, and vice versa, instead of or in addition to via private communications channel 3342.

Virtualized private network 3360 may be, but is not necessarily, subdivided into two or more subnetworks, or subnets, 3370. For example, in implementations that include both a private gateway 3362 and a public gateway 3364, the private network may be subdivided into a subnet 3370A that includes resources (VMs 3324A and storage 3318A, in this example) reachable through private gateway 3362, and a subnet 3370B that includes resources (VMs 3324B and storage 3318B, in this example) reachable through public gateway 3364.

The client may assign particular client public IP addresses to particular resource instances in virtualized private network 3360. A network entity 3344 on intermediate network 3340 may then send traffic to a public IP address published by the client; the traffic is routed, by the provider network 3300, to the associated resource instance. Return traffic from the resource instance is routed, by the provider network 3300, back to the network entity 3344 over intermediate network 3340. Note that routing traffic between a resource instance and a network entity 3344 may require network address translation to translate between the public IP address and the private IP address of the resource instance.

Some embodiments may allow a client to remap public IP addresses in a client's virtualized private network 3360 as illustrated in FIG. 16 to devices on the client's external network 3350. When a packet is received (e.g., from network entity 3344), the network 3300 may determine that the destination IP address indicated by the packet has been remapped to an endpoint on external network 3350 and handle routing of the packet to the respective endpoint, either via private communications channel 3342 or via the intermediate network 3340. Response traffic may be routed from the endpoint to the network entity 3344 through the provider network 3300, or alternatively may be directly routed to the network entity 3344 by the client network 3350. From the perspective of the network entity 3344, it appears as if the network entity 3344 is communicating with the public IP address of the client on the provider network 3300. However, the network entity 3344 has actually communicated with the endpoint on client network 3350.

While FIG. 16 shows network entity 3344 on intermediate network 3340 and external to provider network 3300, a network entity may be an entity on provider network 3300. For example, one of the resource instances provided by provider network 3300 may be a network entity that sends traffic to a public IP address published by the client.

Illustrative System

In some embodiments, a system that implements a portion or all of the methods and apparatus for synchronizing servers using continuous block migration in provider network environments as described herein may include a general-purpose computer system that includes or is configured to access one or more computer-accessible media, such as computer system 4000 illustrated in FIG. 17. In the illustrated embodiment, computer system 4000 includes one or more processors 4010 coupled to a system memory 4020 via an input/output (I/O) interface 4030. Computer system 4000 further includes a network interface 4040 coupled to I/O interface 4030.

In various embodiments, computer system 4000 may be a uniprocessor system including one processor 4010, or a multiprocessor system including several processors 4010 (e.g., two, four, eight, or another suitable number). Processors 4010 may be any suitable processors capable of executing instructions. For example, in various embodiments, processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4020 may be configured to store instructions and data accessible by processor(s) 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for synchronizing servers using continuous block migration in provider network environments, are shown stored within system memory 4020 as code 4025 and data 4026.

In one embodiment, I/O interface 4030 may be configured to coordinate I/O traffic between processor 4010, system memory 4020, and any peripheral devices in the device, including network interface 4040 or other peripheral interfaces. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices 4060 attached to a network or networks 4050, such as other computer systems or devices as illustrated in FIGS. 1 through 16, for example. In various embodiments, network interface 4040 may support communication via any suitable wired or wireless general data networks, such as types of Ethernet network, for example. Additionally, network interface 4040 may support communication via telecommunications/telephony networks such as analog voice networks or digital fiber communications networks, via storage area networks such as Fibre Channel SANs, or via any other suitable type of network and/or protocol.

In some embodiments, system memory 4020 may be one embodiment of a computer-accessible medium configured to store program instructions and data as described above for FIGS. 1 through 16 for implementing embodiments of methods and apparatus for synchronizing servers using continuous block migration in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 4000 via I/O interface 4030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 4000 as system memory 4020 or another type of memory. Further, a computer-accessible medium may include transmission media or signals such as electrical, electromagnetic, or digital signals, conveyed via a communication medium such as a network and/or a wireless link, such as may be implemented via network interface 4040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a provider network comprising:
one or more hardware processors and associated memory that implement a plurality of host devices configured to implement virtual machines (VMs) as resource instances for clients of the provider network; and
a storage subsystem comprising a plurality of storage devices;
one or more devices on the provider network, wherein the one or more devices comprise one or more respective hardware processors and memory, that implement a machine image service configured to:
receive, from a block migration agent on a server on a client network external to the provider network, blocks of data from one or more volumes on the client network that are logically attached to the server on the client network, wherein the blocks include changes made to software and data of the server, and wherein a previous version of the server is instantiated as one or more VM instances on the provider network;
store the blocks to incremental snapshots of the one or more volumes on the storage subsystem; and
generate machine images (MIs) of the server on the storage subsystem according to respective ones of the snapshots of the one or more volumes; and
one or more devices on the provider network, wherein the one or more devices comprise one or more respective hardware processors and memory, that implement a VM service configured to update the one or more VM instances on the provider network according to the MIs of the server generated from one of the snapshots.

2. The system as recited in claim 1, wherein each MI is timestamped according to its generation time, and wherein a given MI includes the changes to the server that were made from the generation time of a previous MI to the generation time of the given MI.

3. The system as recited in claim 1, wherein the blocks are stored in a first format on the one or more volumes on the client network and in a second format on the storage subsystem of the provider network, and wherein the machine image service is further configured to convert the blocks from the first format to the second format prior to storing the blocks on the storage subsystem.

4. The system as recited in claim 1, wherein the server is a VM instantiated in a virtualization environment on a host device on the client network.

5. The system as recited in claim 1, wherein, to update a VM instance on the provider network according to an MI of the server generated from a snapshot, the VM service is configured to:
generate one or more new volumes on the storage subsystem according to the MI;
stop the VM instance;
detach one or more old volumes on the storage subsystem from the VM instance;
attach the one or more new volumes on the storage subsystem to the VM instance; and
start the VM instance, wherein the VM instance boots from the one or more volumes.

6. The system as recited in claim 1, wherein, to update a VM instance on the provider network according to an MI of the server generated from a snapshot, the VM service is configured to replace the VM instance with a new VM instance generated from the MI.

7. The system as recited in claim 1, wherein the machine image service is further configured to, prior to storing the blocks to the incremental snapshots:
receive, from the block migration agent, all blocks of data from the one or more volumes on the client network; and
store the blocks to a base snapshot of the one or more volumes on the storage subsystem, wherein the incremental snapshots reflect changes to the base snapshot.

8. The system as recited in claim 1, wherein the block migration agent comprises:
a kernel agent installed in a kernel space of an operating system (OS) of the server; and
a block copying agent installed in a user space of the OS of the server;
wherein the kernel agent is configured to:
intercept write operations to the one or more volumes on the client network; and
provide update information to the block copying agent according to the write operations;
wherein the block copying agent is configured to:
read the blocks from the one or more volumes according to the update information; and
send the blocks to the machine image service via a connection over an intermediate network.

9. A method, comprising:
iteratively performing, by one or more devices, each device comprising one or more respective hardware processors and memory, on a provider network:
receiving, from a server on a client network, blocks of data from one or more volumes on the client network that are logically attached to the server on the client network, wherein the blocks include changes made to software and data of the server, and wherein a previous version of the server is instantiated as a virtual machine (VM) instance on the provider network;

storing the blocks to a snapshot of the one or more volumes on a storage subsystem of the provider network;

generating a machine image (MI) of the server on the storage subsystem according to the snapshot of the one or more volumes; and updating the VM instance on the provider network according to the MI of the server generated from the snapshot.

10. The method as recited in claim 9, further comprising timestamping the MI according to its generation time, wherein the MI includes the changes to the server that were made from the generation time of a previous MI to the generation time of the MI.

11. The method as recited in claim 9, wherein the blocks are stored in a first format on the one or more volumes on the client network and in a second format on the storage subsystem of the provider network, and wherein the method further comprises converting the blocks from the first format to the second format prior to storing the blocks on the storage subsystem.

12. The method as recited in claim 9, wherein updating the VM instance on the provider network according to the MI of the server generated from the snapshot comprises:

generating one or more new volumes on the storage subsystem according to the MI;
stopping the VM instance;
detaching one or more old volumes on the storage subsystem from the VM instance;
attaching the one or more new volumes on the storage subsystem to the VM instance; and
starting the VM instance, wherein the VM instance boots from the one or more volumes.

13. The method as recited in claim 9, wherein updating the VM instance on the provider network according to the MI of the server generated from the snapshot comprises:

stopping the VM instance;
instantiating a new VM instance from the MI; and
starting the new VM instance.

14. The method as recited in claim 9, further comprising creating a base snapshot of the one or more volumes on the storage subsystem prior to said receiving, wherein the base snapshot includes all blocks of data from the one or more volumes on the client network.

15. The method as recited in claim 9, further comprising performing, by a block migration agent installed on the server in the client network:

intercepting write operations to the one or more volumes on the client network;
determining changed blocks in the one or more volumes according to the write operations; and sending the changed blocks to the one or more devices on the provider network via a connection over an intermediate network.

16. A non-transitory computer-readable storage medium storing program instructions that when executed on one or more computers cause the one or more computers to implement:

a kernel agent in a kernel space of an operating system (OS) on a server on a client network, wherein a version of the server is instantiated as a VM instance on a provider network;

a block copying agent in a user space of the OS on the server;

wherein the kernel agent is configured to:
intercept write operations to one or more volumes attached to the server on the client network, wherein the write operations indicate changes made to software and data of the server; and
provide update information to the block copying agent according to the write operations, wherein the update information indicates locations and sizes of the changes in the one or more volumes;

wherein the block copying agent is configured to:
read blocks from the one or more volumes according to the update information, wherein the blocks include the changes made to the server; and
send the blocks to a storage subsystem on the provider network via a connection over an intermediate network, wherein the blocks are stored in incremental snapshots of the one or more volumes on the storage subsystem.

17. The non-transitory computer-readable storage medium as recited in claim 16, wherein one or more services on the provider network are configured to generate machine images (MIs) of the server on the storage subsystem according to the snapshots and update the VM instance on the provider network according to the MIs of the server generated from the snapshots.

18. The non-transitory computer-readable storage medium as recited in claim 16, wherein the server is a VM instantiated in a virtualization environment on a host device on the client network.

19. The non-transitory computer-readable storage medium as recited in claim 16, wherein the server implements a virtualization environment including one or more VMs.

20. The non-transitory computer-readable storage medium as recited in claim 16, wherein the block copying agent is further configured to, during an initialization phase:

read all blocks of data from the one or more volumes on the client network; and
send the blocks to the storage system on the provider network, wherein the blocks are stored in a base snapshot of the one or more volumes on the storage subsystem.

* * * * *